United States Patent [19]
Johnson et al.

[11] Patent Number: 5,132,826
[45] Date of Patent: Jul. 21, 1992

[54] FERROELECTRIC LIQUID CRYSTAL TUNABLE FILTERS AND COLOR GENERATION

[75] Inventors: Kristina M. Johnson; Gary D. Sharp, both of Boulder, Colo.

[73] Assignee: The University of Colorado Foundation, Inc., Boulder, Colo.

[21] Appl. No.: 522,215

[22] Filed: May 11, 1990

Related U.S. Application Data

[63] Continuation-in-part of Ser. No. 429,304, Oct. 30, 1989, abandoned.

[51] Int. Cl.$^5$ ................................. G02F 1/13
[52] U.S. Cl. ........................ 359/93; 359/53; 359/56; 359/63; 359/73
[58] Field of Search ............... 350/335, 339 R, 350 S, 350/334, 337; 359/53, 56, 63, 66, 73, 93, 94, 100

[56] References Cited

U.S. PATENT DOCUMENTS
4,838,663 6/1989 Lagerwall et al. ............ 350/350 S

FOREIGN PATENT DOCUMENTS
0309774 9/1988 European Pat. Off. .

OTHER PUBLICATIONS
Carrington et al. (1989) Second Internaitonal Conference on Ferroelectric Liquid Crystals Program and Abstracts; Abstract No. 015.
Andersson et al. (1987) Appl. Phys. Lett vol. 51:640 "Submicrosecond electro-optic switching in LC smectic A phase: The solf mode ferroelectric effect", Appl. Phys. Lett. vol. 51 No. 9, 1987 pp. 640-642.
Title et al. "Tunable birefringent networks" SPIE vol. 202 Active optical device, 1979.
Lagerwall "Ferroelectric LCs: The developement of device", Gordon and Breach Science Publishers S.A., vol. 94, pp. 3-62, 1989.
Andersson et al. (1989) J. Appl. Physics 66(10):4983-4995.
Andersson et al. Application of the Soft Mode Ferroelectric Effect MIeeting Abstract from the Second INternational Conference on FLCs held in Goeteborg Sweden, 1989.
Masterson et al., "Ferroelectric liquid crystal tunable filter" Optics letters vol. 14 No. 22, 1989 pp. 1249-1251.

Primary Examiner—Stanley D. Miller
Assistant Examiner—Huy K. Mai
Attorney, Agent, or Firm—Greenlee & Winner

[57] ABSTRACT

Discretely and continuously tunable filers emplying FLC cells are provided. Exemplary discretely tunable filters employ bistable smectic C* FLC cells. Exemplary continuously tunable filters employ smectic A* FLC cells. Single or multiple stage filters are provided. Blocking filters useful for color generation are also provided. The FLC filters provided can be temporally multiplexed.

40 Claims, 13 Drawing Sheets

400 -x- 800    0 -y- 1

400 -x- 800    0 -y- 8

FERROELECTRIC LIQUID CRYSTAL TUNABLE FILTERS AND COLOR GENERATION

This application is a continuation-in-part of U.S. application Ser. No. 429,304, filed Oct. 30, 1989, now abandoned, which is incorporated by reference herein.

FIELD OF THE INVENTION

The present invention relates to tunable optical filters which employ ferroelectric liquid crystal (hereafter "FLC") materials as tuning elements and to color generation using such filters.

BACKGROUND OF THE INVENTION

The surface stabilized ferroelectric liquid crystal (SSFLC) light valve has been shown to possess properties useful in a number of opto-electronic device applications requiring high contrast ratio. These include electro-optic shutters, spatial light modulators for opto-electronic computing, and flat panel display devices. In such devices, the speed of response is often important. This response speed is given approximately by equation 1:

$$\tau = \frac{\eta}{PE} \qquad (1)$$

wherein $\tau$ is the optical response (10%-90%) to an applied voltage step of magnitude E, $\eta$ is the orientational viscosity, and P is the ferroelectric polarization density.

The physics and operation of the SSFLC has been extensively described (Clark, N. A. et al. (1983) Mol. Cryst. Liq. Cryst. 94:213; Clark and Lagerwall U.S. Pat. No. 4,367,924; Clark and Lagerwall U.S. Pat. No. 4,563,059). In the surface stabilized state, FLC molecules lie in layers perpendicular to the glass plates (the so-called bookshelf geometry). The FLC optic axis makes an angle $\pm\theta$ with respect to the layer normal. For many mixtures, $\theta = \pm 22.5°$, so the FLC cell acts like a retarder which can be electronically rotated by 45°. The voltage requirements for such switching devices are modest ($\pm 10$ V), and power consumption is quite low because the voltage need not be applied to maintain the FLC in the switched state: the devices are bistable (Clark, N. A. and Lagerwall, S. T. (1980) Appl. Phys. Lett. 36:899). Typical switching times are <44 μs at room temperature (ZLI-3654 mixture available from E. Merck, D-6100 Darmstadt 1, Frankfurter, Strabe, 250, F.R.G.). Several other alignment configurations for FLC cells have been described (Clark and Lagerwall, U.S. Pat. No. 4,563,059).

The contrast (ratio of transmitted light intensity through the cell in the bright and dark states) in the standard SSFLC cell is greatest when the tilt angle $\theta$ of the FLC material is 22.5°. Under these conditions, at the half wave thickness (where $d = \lambda/2\Delta n$) between crossed polarizers (an entrance polarizer and an exit polarizer or analyzer) the dark state will leave polarization of the input light unchanged, while the bright state will rotate the plane of polarization of the input light through 90°. In general, in the on (switched) state the plane of polarization of the output light will be rotated through $4\theta$, where $\theta$ is the tilt angle.

The orientation viscosity $\eta$ in FLC mixtures generally increases with increasing tilt angle. Often, $\eta$ increases with tilt angle faster than P, and thus materials with low tilt angle (i.e. $\theta < 15°$) often show improved electro-optic response speed relative to similar materials with 22.5° tilt angle. However, this increase in speed is achieved at the expense of throughput, since the output light in the SSFLC is rotated through $<90°$, and a significant amount of the light in the on state is extinguished at the analyzer.

Light valves based upon the electroclinic effect occurring in chiral smectic A* FLC materials exhibit several attractive features (see Andersson et al. (1987) Appl. Phys. Lett. 51:640), including very fast response and voltage regulated gray scale. The electroclinic effect is related to the variation in the birefringence of a material as a function of an applied electric field (see Garoff and Meyer (1977) Phys. Rev. Lett. 38:848). A number of chiral smectic A* materials have been shown to display an electroclinic effect when incorporated into SSFLC type cells. The applied voltage induces or varies the tilt angle in these materials in an analog fashion. The effect is described as being linear in applied voltage with very rapid response. However, for all currently known materials, the maximum tilt angle achieved due to the electroclinic effect is small (i.e. $\theta < 17.5°$).

The distorted helix ferroelectric effect has been described with smectic C* liquid crystals having a short pitch (see Ostrovski and Chigrinov (1980) Krystallografiya 25:560 and Ostrovski et al. in *Advances in Liquid Crystal research and Application*, (1. Bata, ed.) Pergamon, Oxford; Funfschilling and Schadt (1989) J. Appl. Phys. 66:3877). In SSFLC cells incorporating the shortpitch materials, the helix of the material is not suppressed, and thus the helix can be distorted by the application of an electric field. This distortion results in a field dependent change in the tilt angle of the material. DHF materials also display voltage-dependent variations in birefringence. DHF cells are attractive since high induced tilt angles (up to $\pm 38°$) can be attained with applied voltages lower than those required for smectic A* cells. Beresnev et al., EPO Patent Application published Apr. 5, 1989, described FLC cells incorporating DHF materials.

Birefringent filters were first used in solar research where sub-angstrom spectral resolution is required to observe solar prominences. The first type of birefringent filter was invented by Lyot (Lyot, B. (1933) Comptes rendus 197:1593) in 1933. The basic Lyot filter (Yariv, A. and Yeh, P. (1984) *Optical Waves in Crystals*, Chapter 5, John Wiley and Sons, New York) can be decomposed into a series of individual filter stages. Each stage consists of a birefringent element placed between parallel polarizers. The exit polarizer for a particular stage acts as the input (or entrance) polarizer for the following stage. In a Lyot-type filter, fixed birefringent elements are oriented with optic axes parallel to the interface and rotated 45° from the direction of the input polarization. The thickness, and therefore the retardation of the birefringent elements, increases geometrically in powers for two of each successive stage in the Lyot geometry. Multiple stage devices have been demonstrated with high resolution (0.1 angstrom) and broad free-spectral-range (FSR) addressing, for example, the entire visible spectrum (Title, A. M. and Rosenberg, W. J. (1981) Opt. Eng. 20:815).

More recently, research in optical filters has focused on tuning the wavelength of peak transmission. An optical filter which can be rapidly tuned has applications in remote sensing, signal processing, displays and wavelength division demultiplexing. Tunability of otherwise fixed frequency Lyot filters has been suggested and implemented using various techniques (Billings, B. H. (1948) J. Opt. Soc. Am. 37:738; Evans, J. W. (1948) J. Opt. Soc. Am. 39:229; Title, A. M. and Rosenberg, W. J. (1981) Opt. Eng. 20:815). These include mechanical methods such as stretching plastic sheets in series with the birefringent elements (Billing's, B. H. (1948) J. Opt. Soc. Am. 37:738), mechanically rotating waveplates (Title, A. M. and Rosenberg, W. J. (1981) Opt. Eng. 20:815) or sliding wedge plates (Evans, J. W. (1948) J. Opt. Soc. Am. 39:229), changing the retardation of the birefringent elements by temperature tuning the birefringence, or changing the birefringence using electro-optic modulators (Billings, B. H. (1948) J. Opt. Soc. Am. 37:738). Temperature tuning and mechanical tuning methods are inherently slow. Electro-optic tuning of known filter devices, while potentially more rapid, requires large drive voltages and is limited in bandwidth by material breakdown voltages for the thin birefringent elements required (Weis, R. S. and Gaylord, T. K. (1987) J. Opt. Soc. Am. 4:1720).

Other electronically tunable filters, which have been demonstrated include acousto-optic tunable filters (hereafter AOTF) (Harris, S. E. and Wallace, R. W. (1969) J. Opt. Soc. Am. 59:744; Chang, I. C. (1981) Opt. Eng. 20:824), electro-optic tunable filters (hereafter EOTF) (Pinnow, D. A. et al. (1979) Appl. Phys. Lett. 34:391; Lotspeich, J. F. et al. (1981) Opt. Eng. 20:830), multiple-cavity Fabry-Perot devices (Gunning, W. (1982) Appl. Opt. 21:3129) and hybrid filters such as the Fabry-Perot electro-optic Sölc filter (Weis, R. S. and Gaylord, T. K. (1987) J. Opt. Soc. Am. 4:1720).

The operation of the AOTF is based on the interaction of light with a sound wave in a photoelastic medium. Strong acousto-optic interaction occurs only when the Bragg condition is satisfied. Therefore, only one spectral component of incident radiation is diffracted from the structure at a given acoustic frequency. Tuning is accomplished by changing the acoustic frequency. This was the first electrically tunable filter, which succeeded in varying the transmission wavelength from 400 nm to 700 nm by changing the acoustic frequency from 428 MHz to 990 MHz with a bandwidth of approximately 80 nm (Harris, S. E. and Wallace, R. W. (1969) J. Opt. Soc. Am. 59:744). Current AOTF's have 12° fields of view, high throughput, high resolution and broad tunability (Chang, I. C. (1981) Opt. Eng. 20:824). However, power requirements are high for many applications (on the order of 10 watts/cm$^2$) and frequency shifts induced by the filter prohibit the use of AOTF's in laser cavities.

The EOTF consists of a Y-cut LiTaO$_3$ platelet, placed between crossed polarizers, with an array of separately addressable finger electrodes (Pinnow, D. A. et al. (1979) Appl. Phys. Lett. 34:391). Tunability is accomplished by applying a spatially periodic (sinusoidal) voltage to the 100 electrodes. Current applications of this device, however, utilize more elaborate programmable passband synthesis techniques (Lotspeich, J. F. et al. (1981) Opt. Eng. 20:830). While the power requirements for the EOTF are low, it suffers from a small clear aperture and field-of-view. This is also the main disadvantage of the Fabry-Perot devices.

Color switching has been described in liquid crystal displays which incorporate dichroic dyes (see, e.g., Aftergut et al. U.S. Pat. No. 4,581,608). Buzak in U.S. Pat. No. 4,674,841 refers to a color filter switchable between three output colors incorporating a variable retarder which is a twisted nematic liquid crystal cell. Nematic liquid crystals have also been used for tuning optical filters (Kay, W. I., U.S. Pat. No. 4,394,069; Tarry, H. A. (1975) Elect. Lett. 18:47; Gunning, W. (1980) Proc. SPIE 268:190; and Wu, S. (1989) Appl. Opt. 28:48). The main disadvantage of these is their slow tuning speed (~100 ms).

Clark and Lagerwall in U.S. Pat. No. 4,367,924 "Chiral Smectic C of H Liquid Crystal Electro-Optical Device" refer to color control as an attribute of their ferroelectric liquid crystal electro-optical device and state that "[the] sample birefringence and orientation of the two polarizers can be manipulated to give color effects." It appears that the exit polarizers are rotated to select color.

Clark and Lagerwall in U.S. Pat. No. 4,563,059 "Surface Stabilized Ferroelectric Liquid Crystal Devices" refer to color production using FLC layers. At least two methods of color production are discussed. The first involves using spatial multiplexing of a 2×2 pixel array containing FLC cells placed between polarizers to generate four colors where the FLC cells of each pixel in the array have a different thickness. The second method involves two FLC layers positioned on top of one another to give 2×2 colors. Specifically a device comprised of two FLC devices which are positioned such that they have a specific tilt angle of 24° between the optic axes in the switched state is described for color production.

Ozaki et al. (1985) Jpn. J. Appl. Phys. (part 1) 24 (suppl. 24-3):63 refer to a high speed color switching element in which dichroic dyes are mixed with ferroelectric liquid crystals. Color switches and/or displays which combine color filters and ferroelectric liquid crystal cell shutters have been described. See, e.g., Seikimura et al. U.S. Pat. No. 4,712,874; Takao et al. U.S. Pat. No. 4,802,743; Yamazaki et al. U.S. Pat. No. 4,799,776; Yokono et al. U.S. Pat. No. 4,773,737.

Carrington et al. (1989) Second International Conference on Ferroelectric Liquid Crystals Program and Abstracts (Göteborg, Sweden, 27-30 Jun. 1989) Abstract 015 refer to rapid switching of spatial arrays of FLC two color switches in color displays.

Lagerwall et al. (1989) "Ferroelectric Liquid Crystals: The Development of Devices" Ferroelectrics 94:3–62 is a recent review the use of FLC cells in device applications. In a selection called "SSFLC Color" the reviewers refer to color display (e.g. for television applications). The reviewers refer to the production of color using a red-green-blue microfilter repetitive pattern in front of a liquid crystal and reference J. C. White 91988) Phys. Tech. 19:91. The reviewers refer to a multicolor FLC screen and reference Matsumoto et al. (1988) SID 88 Digest 41. The reviewers also refer to "color sequential backlighting" and reference J. C. White (1988) supra, and to C. M. Waters (1988) EPO Patent Application Publication No. 0 261 901.

SUMMARY OF THE INVENTION

The present invention provides discretely tunable and continuously tunable optical filters which incorporate ferroelectric liquid crystal (FLC) cells as wavelength tuning elements. Discretely tunable filters generally will incorporate bistable smectic C* FLC cells which are SSFLC cells; however, smectic A* FLC cells and distorted helix ferroelectric (DHF) liquid crystal cells whose tilt angle changes as a function of the magnitude and sign of the applied voltage can also be adapted for use in the discrete filters. Continuously tunable filters comprising FLC cells are constructed by taking advantage of the field dependent change in tilt angle of the smectic A* cells or DHF cells, or for certain applications with slow response detectors by employing the very rapid switching capability of FLC cells.

Discretely tunable single or multiple stage birefringent filters are implemented using FLC cells as variable retarders in combination with an additional birefringent element. A stage of such a filter, which is defined by polarizer boundaries oriented in a fixed position with respect to each other, contains at least one birefringent element, at least one FLC cell and means for applying an electric field to the FLC cell to induce it to switch from an unswitched state to a switched state. The FLC cell is oriented such that in its unswitched state the plane defined by the optic axis of the cell and the propagation axis is parallel to the plane of polarization of entering light the stage. The birefringent element can be a fixed birefringent element whose transmission characteristics are determined by its thickness or an FLC which is a variable birefringent element or retarder and which functions as a birefringent element when it is in its switched state. The orientation of the fixed birefringent element within the stage can be varied to obtain a desired filter transmission spectrum, however, for many applications, the fixed birefringent elements of these filters will be oriented at an angle of 45° with respect to the input polarization of light. The entrance and exit polarizers of a stage of the filter are oriented in a fixed manner with respect to one another. The angle between the polarizers can be varied to achieve a desired filter transmission spectrum, however, for many applications it will be desired to employ parallel or perpendicular polarizers. Discrete filters can contain one or more FLC cells in a stage. These FLC cells can be synchronously switched or independently switched depending on the application of the filter and/or the desired transmission output. The FLC cells may have the same thickness or vary in thickness, the selection of thickness of the FLC cell also depends on the application of the filter and the desired transmission output.

Since the output of a birefringent element is elliptically polarized, the FLC cells employed as variable retarders in these filters must precede the birefringent element. In the case in which two or more independently switched FLC cells are included within a single stage of the filter, a switched FLC cell cannot precede an unswitched FLC cell along the light propagation axis.

The design limitation noted for discretely tunable filters also apply to the discretely tunable filters which are employed in the temporally multiplexed continuously tunable filters of the present invention. Filters which have two or more wavelengths or transmission spectra are useful for temporal multiplexing. The driving scheme of the FLC cells is adapted to the desired use of the filter and the desired transmission spectra.

An embodiment of a discrete filter incorporating FLC cells that is particularly useful for application to temporal multiplexing is a wavelength blocking filter. A blocking filter useful for temporal multiplexing allows switching between at least two spectral outputs, e.g., two wavelenqths of light. Each stage of the filter is bounded by polarizers, either parallel or perpendicular depending on the desired spectral transmission. Each stage contains a single FLC cell. The single cell may, however, be replaced with multiple FLC cells that are switched together. The thickness of the FLC cell in the first stage is selected to block a first undesired wavelength of light, thus transmitting the unblocked wavelengths. The filter's second stage contains with a second FLC cell which is selected to block a second undesired wavelength of light. As such, when the two FLC cells in the two stages are synchronously switched, a desired third wavelength is transmitted. A two stage filter having this configuration switches between transmitting the output of the source unchanged or no transmission (depending on the orientation of the polarizers and the choice of FLC cells) and a selected wavelength band of light that is not blocked by the two filter stages. A three stage blocking filter can therefore be switched between three colors, for example, red, green and blue. Temporal multiplexing of a such a three stage filter can result in a perception of a wide range of colors by an observer. The generated colors are linear combinations of the colors switched by the filter.

The blocking filters are not only useful for selected particular narrow wavelength bands. The blocking filter can be adapted by selection of FLC cell thicknesses, by the addition of filter stages, by the orientation of polarizers and by the application of different FLC driving schemes to obtain a desired transmission output. Temporal multiplexing can in general be applied to these blocking filters to rapidly switch between any such filter transmission outputs.

The filters of the present invention which incorporate smectic A* FLC cells or DHF cells are continuously tunable by application of an electric field over a range of wavelengths defined by the maximum tilt angle of the ferroelectric material used in the FLC cell. These filters can contain a single stage or multiple stages with a stage, as defined by two polarizers at a fixed angle with respect to one another, containing at least one birefringent element, an achromatic quarter-wave plate, at least one FLC cell and a means for applying an electric field to the FLC cell. The birefringent element and the achromatic quarter-wave plate are positioned along the light propagation axis between the polarizers with the birefringent element positioned between the entrance polarizer and the achromatic quarter-wave plate. The FLC cell is positioned along the light propagation axis between the achromatic quarter-wave plate and the exit polarizer and is oriented such that in its unswitched state the plane defined by the optic axis of the cell and the light propagation axis is parallel to the plane of polarization of light entering the stage. The tilt angle of the FLC material in the FLC cell is dependent on the magnitude and sign of the applied electric field. When the magnitude and/or sign of the electric field applied to the cell is changed the transmission spectrum of the filter is varied. The tuning bandwidth of the filter will depend on the maximum tilt angle that can be attained on application of said electric field to the FLC cells in the filter. Two FLC cells can be cascaded to double the tuning bandwidth of a filter stage.

The FLC cells of the filters of the present invention are switched between states by means of application of an electric field. Any such means that achieves the desired result, i.e., switching, can be employed. A direct voltage can be applied to the cell or some form of varying voltage can be applied. An electric field can be induced by activating a photosensor with light. The applied field can be electrically or optically induced by any means known in the art.

Although surface stabilized FLC cells with a bookshelf type alignment are the most widely used ferroelectric cells, FLC cells having other types of alignment are known in the art including those with homeotropic alignment. All such switchable FLC cells can be applied for use in the filters of the present invention.

A variety of FLC materials, pure compounds and mixtures, are currently known in the art. Any such mixtures either currently known or developed in the future can be employed in the FLC cells of the present invention.

The discretely tunable filters of the present invention are useful over a wide range of wavelengths ranging from infrared wavelengths to about 300 nm. The continuously tunable filters of the present invention which are temporally multiplexed discretely tunable filters, in principle, are useful over the same wavelength range, but are continuously tunable only when a slow response detector (i.e. a detector that averages over many switching cycles of the filter) is used. These filters are particularly useful in the visible wavelength region and for applications in which the human eye is the detector (e.g. color generators, displays). The continuously tunable filters of the present invention which incorporate smectic A* and distorted helix FLC cells are generally useful over a wide spectral range, however, the specific wavelength region over which they can tune is limited by the maximum tilt angle that can be achieved by application of an electric field.

Filter stages defined by polarizer boundaries function as independent units and can be combined to make multiple stage filters. The exit polarizer for the preceding stage is the entrance polarizer for the next stage. In a multiple stage filter the ratio of the thicknesses of all the birefringent elements in a stage (i.e. FLC cells and fixed birefringent elements) must be the same in all stages. For example, in the Lyot-type filter structure the thicknesses of all birefringent elements in sequential stages increase in the geometric progression: 1,2,4, . . . .

The stages of a discretely tunable filters can, in general, be combined along a light propagation axis with stages of continuously tunable filters.

DETAILED DESCRIPTION OF THE INVENTION

The present invention provides discretely tunable filters in which FLC waveplates function as electronically controllable phase retarders that are incorporated into each stage of a fixed frequency filter configuration, such as that of a Lyot filter. Single and multiple stage filters are provided. The addition of such a retarder to a filter stage, oriented with crystal axis along the direction of polarization, does not change the spectral transmission characteristics of the filter. However, rotation of the FLC waveplate by an appropriate angle is equivalent to increasing the thickness of the birefringent element. This effectively changes the design wavelength of the filter (in the FLC switched state), allowing discrete tuning between wavelengths.

Figure 1:
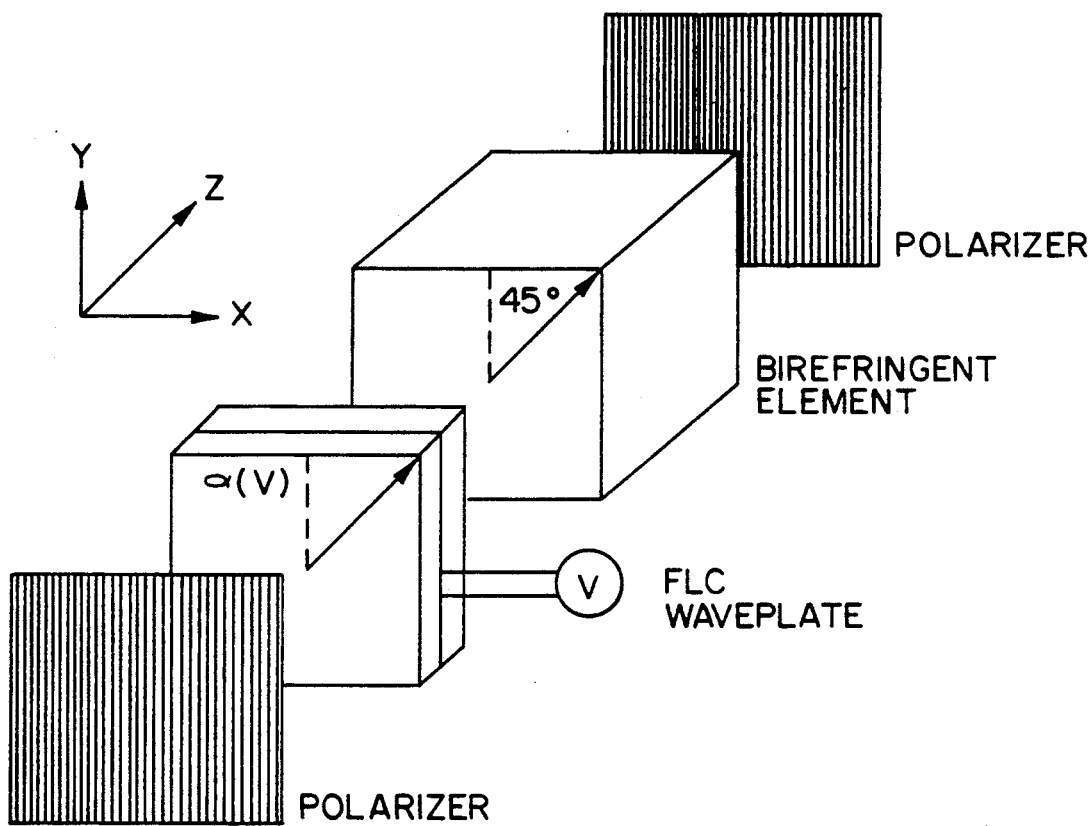
FIG. 1 illustrates a single stage of a smectic C* FLC tunable Lyot-type filter. The net retardation of the stage can be modulated by electronically rotating the crystal axes [α(V)] of the FLC waveplate.

The operation of a discretely tunable birefringent filter using FLC cells can be understood by analyzing a single filter stage, as shown in FIG. 1. This single-stage filter contains a fixed birefringent element and an FLC cell. The direction of propagation of light is along the z axis of the cartesian coordinate system. The faces of the birefringent plates and the FLC cells are normal to the z axis while the electric vector of light transmitted by the polarizers lies along the y axis. The optic axes of the waveplates are in the plane normal to the z axis. To describe the operation of a typical fixed frequency birefringent Lyot-type filter, it is initially assumed that the optic axis of the FLC is oriented along the y axis, transmitting the field with no retardation (the unswitched state). For the case in which the fixed birefringent element is rotated by 45° about the z axis (the switched state), the incident linearly polarized light is divided into two equal amplitude eigenwaves, which travel at different phase velocities through the birefringent material. The retardation between the two waves at the exit of the birefringent element is given by $$\Gamma(\lambda) = \frac{2\pi \Delta n d}{\lambda}, \quad (2)$$

where n is the birefringence of the material, d is the material thickness and $\lambda$ is the free space wavelength. The two waves interfere at the exit polarizer (positioned in this case parallel to the entrance polarizer) such that only wavelengths that are in phase achieve unity transmission. The transmission spectrum for the $n^{th}$ stage of a Lyot-type filter is given by $$T_n(\lambda) = \cos^2[\Gamma_n(\lambda)/2] \quad (3).$$

The transmission of a multiple stage filter is the product of the intensity transmittances of the individual filter stages. In a conventional Lyot filter, the thickness of each birefringent element is always twice that of the previous stage. Each subsequent stage exhibits a transmission spectrum with half the spectral period of the previous stage and therefore provides blocking for the following stage. The transmission spectrum of an N stage filter can be written in the form of a replicated sin function (Yariv, A. and Yeh, P. (1984) *Optical Waves in Crystals*, Chapter 5, John Wiley and Sons, New York).

$$T(\lambda) = \frac{1}{4^N} \frac{\sin^2\left[\frac{2^N \pi \Delta n d}{\lambda}\right]}{\sin^2\frac{\pi \Delta n d}{\lambda}}. \quad (4)$$

The spectral period of the filter, or FSR, is determined by the stage with the thinnest birefringent element. The resolution of th filter is determined by the thickest element. The transmission of a Lyot-type filter (or any other multiple-stage birefringent filter) does not depend on the order of the stages, i.e. the stages in the filter need not be ordered by increasing thickness of birefringent elements.

The transmission spectrum of a single filter stage can be determined using the 2×2 Jones calculus (Jones, R. C. (1941) J. Opt. Soc. Am. 31:488). These results can easily be extended to a multiple stage Lyot-type device. The output of the $n^{th}$ stage can be represented by the matrix equation $$E'_n(\lambda) = P_y W_n(\lambda) P_y E_n(\lambda) \quad (5)$$

where $E_n(\lambda)$ and $E'_n(\lambda)$ are the column vectors giving the x and y components of the input and transmitted electric fields, respectively, $P_y$ is the matrix representing polarizers oriented along the y axis and $W_n(\lambda)$ is the matrix for a retarder with crystal axes rotated 45° about the z axis. These matrices are expressed as (Yariv, A. and Yeh, P. (1984) *Optical Waves in Crystals*, Chapter 5, John Wiley and Sons, New York)

$$P_y = \begin{bmatrix} 0 & 0 \\ 0 & 1 \end{bmatrix}, \quad (6)$$

$$W_n(\lambda) = \begin{bmatrix} \cos[\Gamma_n(\lambda)/2] & -i\sin[\Gamma_n(\lambda)/2] \\ -i\sin[\Gamma_n(\lambda)/2] & \cos[\Gamma_n(\lambda)/2] \end{bmatrix}$$

where the retardation, $\Gamma_n(\lambda)$, is given by $$\Gamma_n(\lambda) = \Gamma^F_n(\lambda) + \Gamma^C_n(\lambda) \quad (7)$$

Here, $\Gamma^C_n(\lambda)$ is the retardation of the fixed birefringent plate and is given by $$\Gamma_n^F(\lambda) = \frac{2^n \pi \lambda_A}{\pi}, \quad (8)$$

where $\lambda_A (= \Delta n d)$ is the design wavelength of the filter in the unswitched state. This is the wavelength at which the birefringent element in the first stage is a full-wave plate, assuming the specific orientation of filter elements shown in FIG. 1. Equation 8 assumes negligible dispersion of the birefringent elements throughout the tuning range. $\Gamma^C_n(\lambda)$ is the net additional retardation due to the $2^{n-1}$. FLC's. In the unswitched state, this retardation is zero. In the switched state ($\alpha = 45°$), the filter is tuned to a second wavelength, $\lambda_B$, due to the additional retardation. This retardation can therefore be written as $$\Gamma_n{}^C(\lambda) = \begin{cases} 0 & \text{Unswitched} \\ 2^n\pi \dfrac{\Delta\lambda}{\lambda} \cdot \dfrac{\Delta n(\lambda)}{(\lambda_B)} & \text{Switched} \end{cases} \quad (9)$$

where $\Delta n(\lambda)$ is the wavelength dependent birefringence of the FLC's and $\Delta\lambda = (\lambda_B - \lambda_A)$. Due to the highly dispersive nature of liquid crystals, this expression includes the effect of dispersion of the FLC birefringence. Using Equations 5 and 6 and the relation $T(\lambda) = |E'(\lambda)/E_y(\lambda)|^2$ yields the intensity transmission given by Equation 2, where $$\Gamma_n(\lambda) = \begin{cases} \dfrac{2^n\pi\,\lambda_A}{\lambda} & \text{Unswitched} \\ \dfrac{2^n\pi}{\lambda}\left[\lambda_A + \Delta\lambda\dfrac{\Delta n(\lambda)}{\Delta n(\lambda_B)}\right] & \text{Switched} \end{cases} \quad (10)$$

A model describing the birefringence of liquid crystals based on a modified version of the Clausius Mosotti equation of molecular polarizability has been recently proposed (Wu, S. (1986) Phys. Rev. A 33:1270). This analysis has shown excellent agreement with experiment and allows us to express the FLC birefringence, $\Delta n$, as $$\Delta n(T,\lambda) = G(T)\dfrac{\lambda^2(\lambda^*)^2}{\lambda^2 - (\lambda^*)^2} \quad (11)$$

where $G(T)$ is a temperature dependent parameter in units of $nm^{-2}$, which is a function of the difference in transition oscillator strengths between the extraordinary and ordinary directions for light incident on the liquid crystal molecules, and $\lambda^*$ is the mean U.V. resonance wavelength. In order to obtain the parameters required in the above equation the transmission characteristics of the FLC's placed between parallel and crossed polarizers were analyzed. Experimentally measured values for these parameters are: $G(T)d = 2.08 \times 10^{-3}\,nm^{-1}$ and $\lambda^* = 245.0\,nm$.

A three-stage Lyot-type filter (FIG. 2) was designed incorporating SSFLC cells as waveplates (Example 1). Experimental filter transmission spectra are compared in FIG. 3 with spectra calculated using the equations presented in the analysis above.

Figure 4:
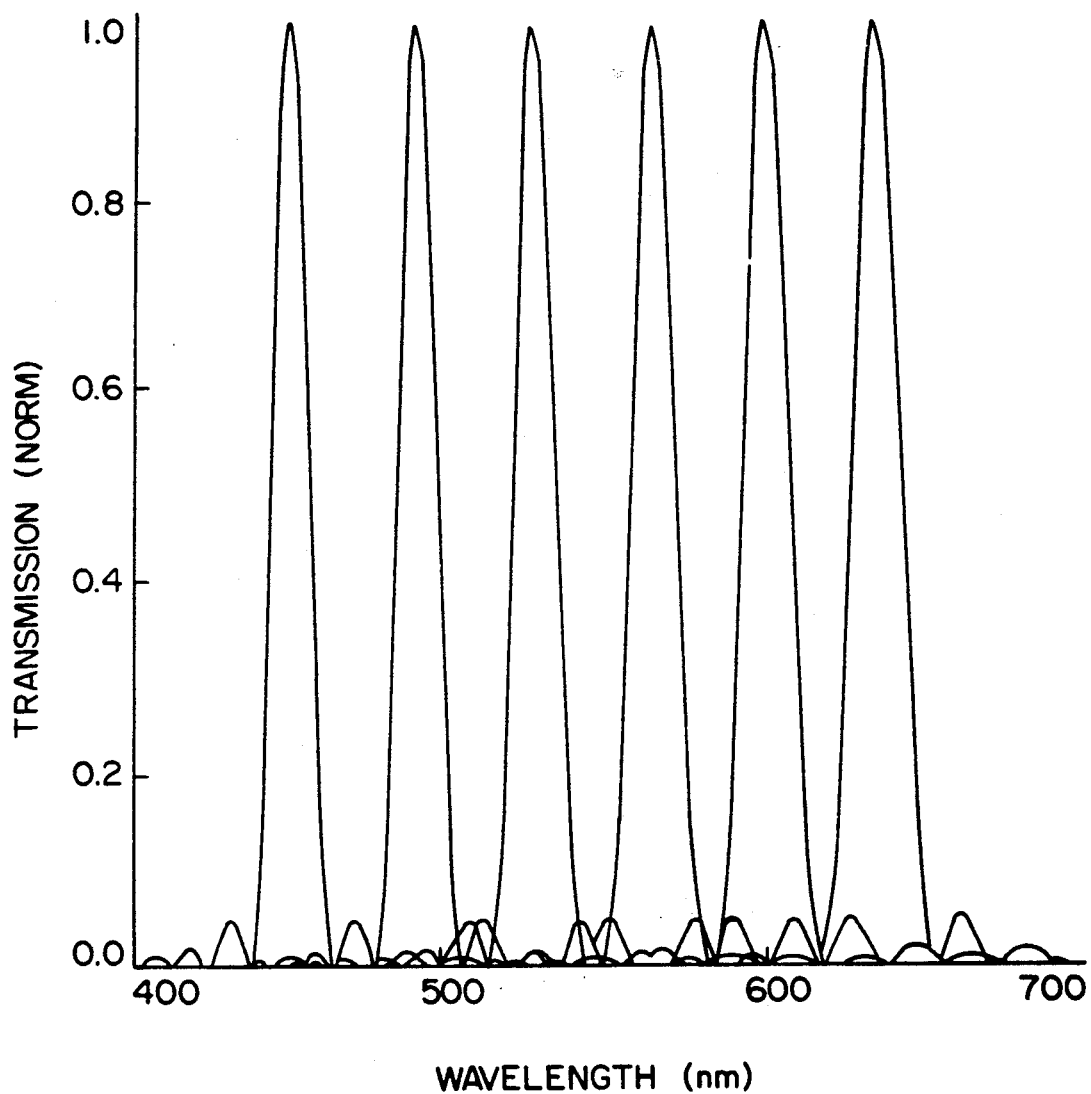
FIG. 4 illustrates computer simulated superimposed transmission curves for a 5 stage, 6 channel SSFLC-based tunable filter. The filter has transmission peaks at 450 nm, 492 nm, 530 nm, 566 nm, 600 nm and 634 nm.

A computer simulation of the filter transmission spectrum of a six-channel, five-stage Lyot-type filter is shown in FIG. 4 (see Example 1). The simulated filter contained five FLC cells and a birefringent element in each stage. The thicknesses of all filter elements (FLC cells and birefringent elements) increased in the geometric progression 1, 2, 4, 8, with increasing numbers of stages. While the order of stages does not affect transmission, the ratio of thicknesses of the elements within a given stage to the thickness of the corresponding element in another stage must be constant. If, for example, the thickness of the birefringent element in a first stage is 3 times the thickness of that element in a second stage, then the ratio of thickness of each corresponding FLC cell in the first stage to the corresponding FLC cell in the second stage must be 3.

The number of outputs that can be obtained by discrete tuning of a filter is 1 plus the number of switchable FLC cells in a stage. For example, a stage containing one birefringent element and one FLC cell can be switched between two selected transmission spectra. A stage containing one birefringent element and two FLC cells can be switched between three transmission spectra.

Filter stages need not contain a fixed birefringent element. The birefringent element can be replaced by an FLC cell, making it a variable birefringent element. In this case, in the unswitched state the filter transmits essentially the transmission spectrum of the light source entering the filter with no effect on wavelength (except possibly that due to dispersion).

In cases in which fixed birefringent elements are combined with FLC cells in a filter stage, the switched FLC cell(s) must precede the fixed element along the light propagation axis as light exiting the birefringent element is elliptically polarized.

In cases in which independently switchable FLC cells are combined in a single stage of a filter, a switched FLC element cannot precede an unswitched FLC cell along the light propagation axis, as light exiting a switched FLC cell is elliptically polarized. Thus, for the case in which two independently switchable FLC cells are combined in a single filter stage, three transmission outputs can be obtained: (1) when both FLC cells unswitched; (2) when both FLC cells are switched and (3) when only the second FLC is switched.

In multiple stage filters the corresponding FLC cell in each of the stages must be synchronously switched. Within a stage of a discretely tunable filter of the present invention, the relative orientations of the polarizers is fixed, but can be selected to obtain a desired transmission spectrum. Similarly, while in most applications the fixed birefringent element will be oriented at an angle of 45° with respect to the plane of polarization of light entering a filter stage, this angle can also be selected to obtain a desired transmission spectrum. The thickness of the birefringent element and the thicknesses of any FLC cells employed in the filters are also selected to achieve a desired output transmission spectrum.

A unique characteristic of FLC cells is their fast switching speeds (order of 10's to 100's of $\mu sec$). Filters of the present invention are capable of $> 10$ kHz tuning rates, for example, between two or more discrete wavelengths. In situations where relatively slow light/color detectors are used, such as with photographic or movie film, or the human eye, pseudo colors can be generated using the rapidly switching filters described herein. Rapid switching between two primary color stimuli can be used to generate other colors, as perceived by the slow detector, which are mixtures of the primary colors. For example, the two monochromatic stimuli, 540 nm (green) and 630 nm (red) can be mixed in various portions to create the perception of orange (600 nm) and yellow (580 nm). Optically, this mixing can be done by varying the quantity of power of the primary stimuli in a transmission. The same result can be achieved by switching between the two stimuli (spatially superimposed or closely adjacent) at rates faster than the response time of the eye (or any detector which averages over many periods). Colors can be generated in this way using the filters described herein by varying the time for which the filter is tuned to any particular primary stimulus compared to another primary stimulus. By changing the percentage of a square wave period during which the filter is tuned to one of the primary stimuli with respect to another (i.e. varying the duty cycle of an applied voltage, for example), there is a perceived generation of colors which are mixtures of the primary inputs. In effect, the quantity of optical power transmitted in each primary stimulus is varied by changing the ratio of time which the filter is tuned to each of the primary bands. The response time of the eye is about 50 Hz. The eye will thus average optical power over many cycles of filter switching, and many colors can be generated for visual detection.

Color perception by the human eye is actually the result of the physical wavelength detection by the eye combined with interpretations of that detection by the brain. Color perception is often analyzed using a chromaticity diagram like the representative diagram provided as FIG. 5. In this diagram, the spectral colors are found along the curved line from violet at 400 nm to red at 700 nm. The diagram indicates a color space that can be accessed on mixing different amounts of the spectral colors. As suggested by the shape of the diagram, mixtures employing varying amounts of three spectral colors (preferably a red, green and blue) will allow access to the widest range of colors. Specifically referring to the temporal mixing of the filters of the present invention, changing the duty cycle or the applied field shifts the color perceived by the observer, and a filter which switches rapidly between a red, green and blue output can be used to generate color mixtures which are linear combinations of those three colors.

Figure 5:
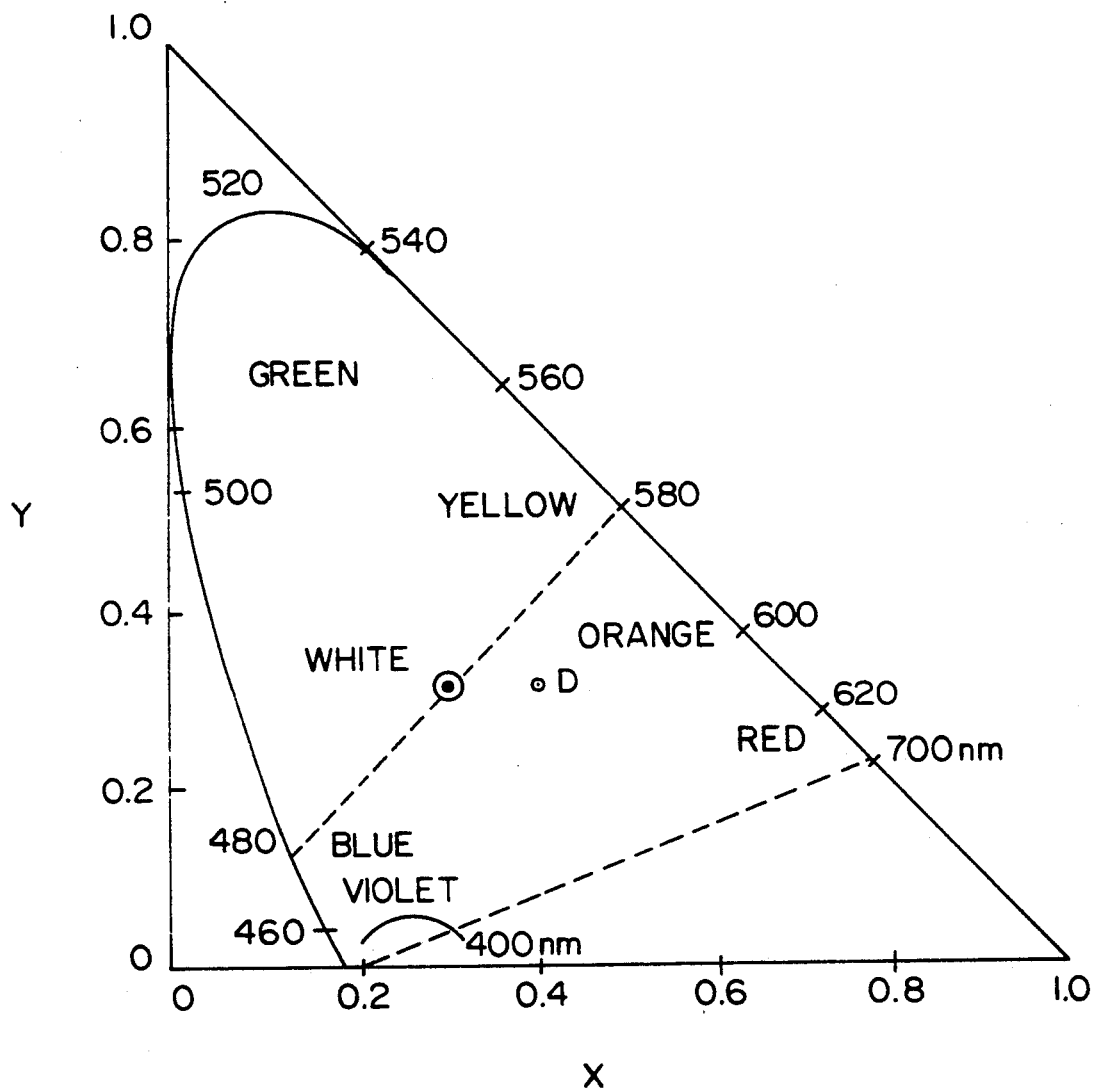
FIG. 5 illustrates an exemplary chromaticity diagram for visible wavelengths (See Naussau (1983) *The Physics and Chemistry of Color*, Wiley Interscience, New York, Chapter 1.) Colors are indicated and wavelengths are indicated in nanometers (nm) The color corresponding to standard daylight $D_{65}$ is indicated. The diagram given is generalized and is provided to illustrate that three colors define a color space.
Figure 6:
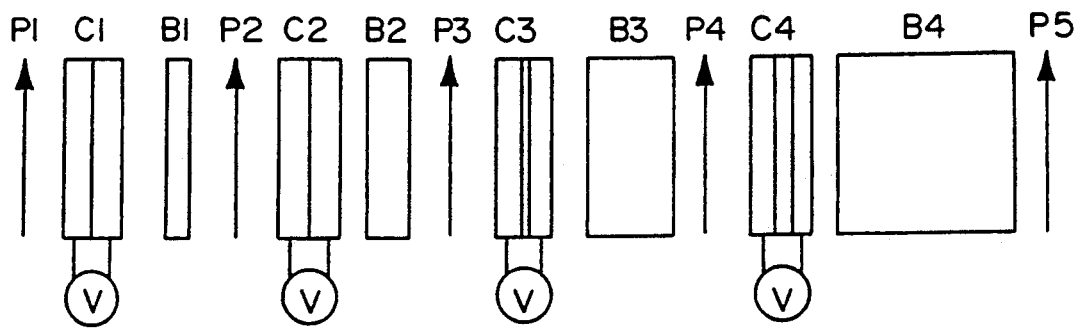
FIG. 6 illustrates a four-stage, two-channel Lyot-type filter used to implement temporal multiplexing of FLC cells to achieve continuously varying visual color generation. P1-P5 are parallel polarizers which define the four filter stages. B1-B4 are fixed birefringent elements which are $\pi$, $2\pi$, $4\pi$ and $8\pi$ wave plates, respectively, at 540 nm. C1-C4 are FLC cells of varying optical thickness. The thickness of the FLC layer in cell C1 is 0.6 μm, that of C2 is 1.2 μm, that of C3 is 2.4 μm and that of C4 is 4.8 μm. The FLC cells in all of the filter stages are synchronously switched. In the unswitched state the filter transmit green light (540 nm). In the switched state the filter transmits red light.

A multiple visible color generator employing Lyot-type filters with fast switching FLC cells is illustrated in FIG. 6. This four-stage filter was designed (Example 2) to switch rapidly between two wavelengths (green and red) to visually generate colors which are linear combinations of the design wavelengths. As seen by reference to the chromaticity diagram of FIG. 5, colors ranging from red, orange, yellow through green should be generable. FIG. 7 illustrates the observed visible color output of the filter of FIG. 6 for various pulsing sequences (on cycles of on and off switching) of the FLC cells. As in all multiple stage filters, the corresponding FLC cells in all stages are synchronously switched. For example, a voltage duty cycle which results in the filter being rapidly switched between red and green, where the time that the filter transmits red light is about equal to the time the filter transmits green light, generates a perceived yellow color. Variations in the duty cycle applied to the filter generate a continuous range of colors between red and green.

Incorporation of an additional FLC cell in each stage of a filter like that of FIG. 6 allows temporal switching between three colors (e.g. red, blue and green). Application of driving schemes analogous to those used and illustrated with the two color filter (FIG. 7) results in a visible color generator which can access a broad area of perceived visible color space.

As a further implementation of the visible color generator employing rapidly switching FLC cells, the present invention also provides FLC cell blocking filters.

FLC cells with the required thickness and optical transmission properties or a particular color generation application can be readily fabricated using techniques known to the art. Application of an appropriate voltage duty cycle scheme to switch the desired pairs of FLC cells can generate a range of perceived colors (color space), as illustrated in FIG. 5.

In addition a three-stage, three-color blocking filter will transmit the source light (most often white) with no wavelength effect in the unswitched state, and will transmit no light in the fully switched state (black). FLC pulsing schemes of this filter can include switching to white and black to allow more flexible selection of generated colors. Blocking filters switching between two selected wavelengths or more than three selected wavelengths can be implemented by appropriate selection of FLC cells (thickness) and positioning of polarizers. Additional spectral purity of transmitted color (i.e. narrower band width) can be achieved while retaining blocking of unwanted colors by increasing the number of stages in the filter with appropriately selected FLC cells in the stages.

Figure 8:
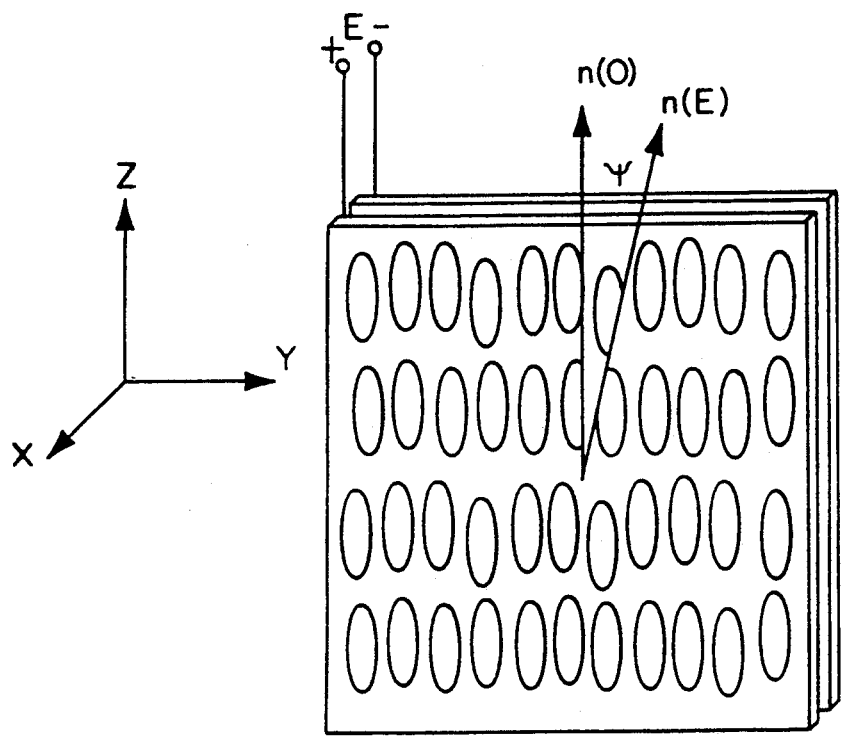
FIG. 8 illustrates a smectic A* liquid crystal cell with the molecules arranged in a bookshelf geometry and in the z-y plane of the containing glass plates. Application of an electric field (E) switches the molecules form the unperturbed state along the layer normal (z axis) denoted by n(0), to the tilted state n(E). Tilt angle is a function of applied field.

The present invention also provides continuously tunable filters which do not require temporal multiplexing and are not limited to use with slow response detectors or to use in the visible spectrum. These filters utilize smectic A* (SmA*) liquid crystal cells and DHF liquid crystal cells. The physics and operation of the surface stabilized SmA* device has been described elsewhere (Clark, N. A. et al. (1983) Mol. Cryst. and Liq. Cryst. 94:213; and Andersson et al (1987) Appl. Phys. Lett. 51:640). In the smectic A* phase, the optic axis is aligned with the layer normal (See FIG. 8). Near the C*-A* phase transition, the elastic constant approaches zero. This allows the optic axis to tilt as a linear function of applied voltage. Placed between crossed polarizers, the device acts like an analog intensity modulator. The voltage requirement for achieving the maximum tilt angle of 12°–17.5° for a SmA* device is modest ($\pm 30$ V in the A* phase). Typical switching speeds are $\leq 100$ ns. Furthermore, a SmA* ferroelectric liquid crystal tunable filter (continuous FLCTF) can be built with large entrance apertures, as these cells can be fabricated on large substrates. Recently described DHF cells will function similarly to the smectic A* cells in continuously tunable filter configurations of the present invention. The achievable maximum tilt angles of known DHF materials ($\pm 38°$) are significantly larger than those of smectic A* materials. DHF cells thus will allow wavelength tuning over wide ranges.

Figure 9:
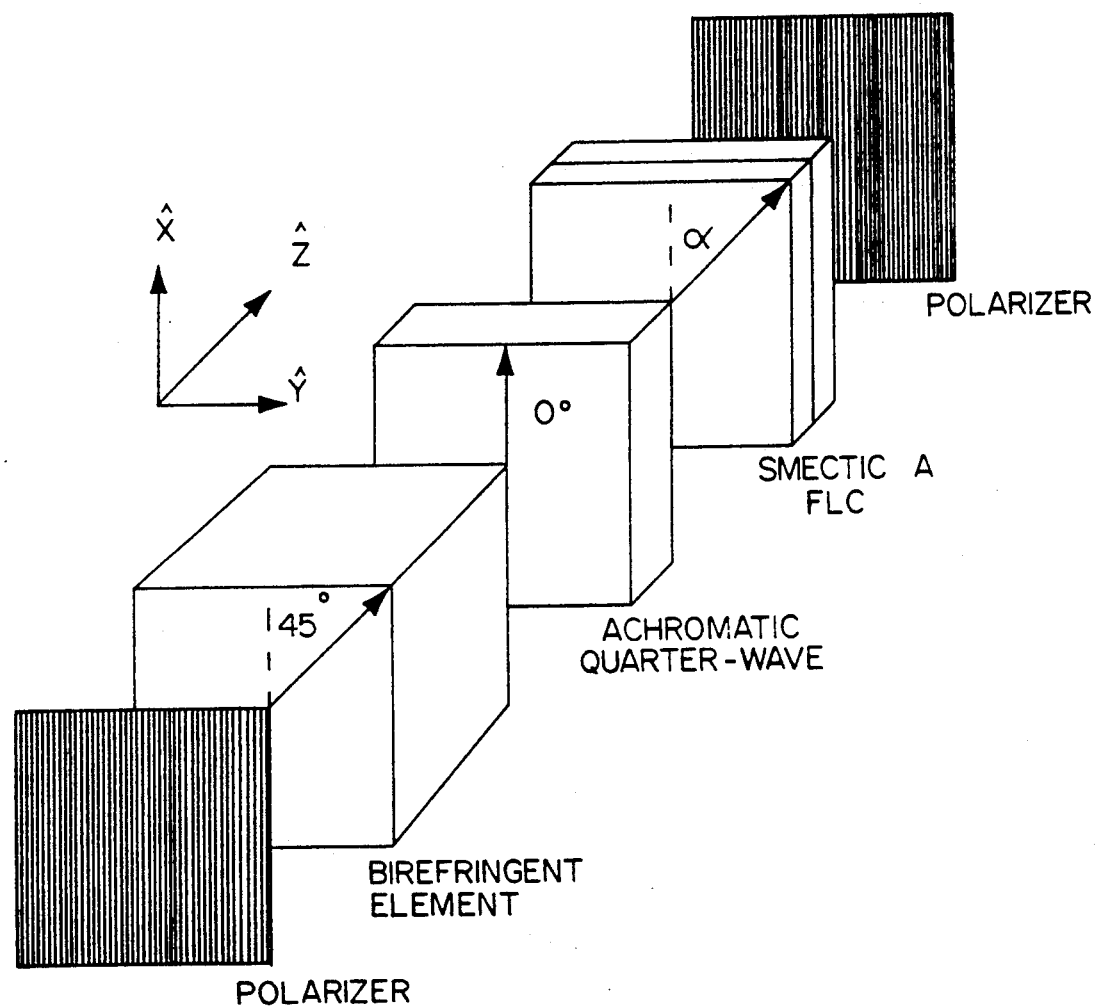
FIG. 9 illustrates a single stage smectic A* FLC continuously tunable filter containing two FLC half-wave plates. The device is tuned to a desired wavelength by electronically rotating the optical axis [α(V)] of the FLC half-wave plate.

FIG. 9 illustrates the operation of the smectic A* LC tunable filter (LCTF). The direction of propagation of light is along the z axis, the faces of the birefringent plates and the LC's are normal to the z axis, with polarizers oriented along the x axis. Since the birefringent element is rotated by 45° with respect to the x axis, the input is divided into two equal amplitude waves, which travel at different phase velocities through the material. The retardation between the two waves at the exit of the birefringent element is given by $$\Gamma(\lambda) = 2\pi(\Delta)nd/\lambda \qquad (12)$$

where $(\Delta)n$ is the birefringence of the material, d is the material thickness and $(\lambda)$ is the free space wavelength.

In general, the polarization of broad-band light exiting the birefringent element is elliptical, with field components parallel and perpendicular to the direction of the input polarization. Denoting these field amplitudes, $E_x$ and $E_y$, respectively, the ellipticity ($E_y/E_x$) is a function of wavelength. The field exiting the birefringent element is incident on the achromatic quarter-wave plate, which functions as an ellipticity analyzer (Title, A. M. and W. J. Rosenberg (1981) Opt. Eng. 20:815). This element gives a retardation of $\pi/2$, independent of wavelength, bringing the quadrature field components into phase. Therefore, the achromatic quarter waveplate converts elliptical polarizations into linear polarizations with wavelength dependent orientation. The amplitudes of the field components are $E_x(\lambda)=\cos[\Gamma(\lambda)/2]$ and $E_y(\lambda)=\sin[\Gamma(\lambda)/2]$, respectively, where $\Gamma(\lambda)$ is given by Equation 12. Since these two components are in phase, this represents a linearly polarized field oriented at an angle, $\Gamma(\lambda)/2$. Tuning is therefore accomplished by simply following the achromatic quarter wave plate with a rotatable exit polarizer, which selects the desired wavelength. In a multiple state filter this would require rotating every element in subsequent stages, in order to maintain the desired filter geometry. Furthermore, this approach requires mechanical rotation to achieve tuning, which is relatively slow.

A simpler approach that has been described is to introduce a rotatable achromatic half-wave plate (giving a constant phase delay of $\pi$ for all wavelengths) into each stage of the filter (Title and Rosenberg, supra). A half-wave plate, oriented at an angle $\phi$ to a linearly polarized input, simply reflects the linear polarization about the fast axis of the crystal, giving a rotation of $2\phi$. Therefore, a rotatable half-wave plate can be oriented so as to reflect the desired wavelength to the direction of the exit polarizer. A similar tunable filter can be achieved using the fast response SmA* or DHF ferroelectric liquid crystal cells.

The transmission spectrum of the tunable color filter, as illustrated in FIG. 9, can be determined using Jones calculus (Jones, R. C. (1941) J. Opt. Soc. Am. 31:488). The output of the filter can be represented by the matrix equation $$E'(\lambda) = P_x W(\lambda) A B(\lambda) P_x E(\lambda) \tag{13}$$

where $E(\lambda)$ and $E'(\lambda)$ are the column vectors giving the x and y components of the input and transmitted electric fields, respectively, and $P_x$ and $B(\lambda)$ are the matrices representing the polarizers oriented along the x axis and the fixed birefringent element with crystal axes rotated by 45° from the x axis, respectively. These matrices are given by Yariv, A. and P. Yeh (1984) *Optical Waves in Crystals*, Chapter 5, John Wiley and Sons, New York:

$$P_x = \begin{bmatrix} 1 & 0 \\ 0 & 0 \end{bmatrix}, \tag{14a,b}$$

$$B(\lambda) = \begin{bmatrix} \cos[\Gamma(\lambda)/2] & -i\sin[\Gamma(\lambda)/2] \\ -i\sin[\Gamma(\lambda)/2] & \cos[\Gamma(\lambda)/2] \end{bmatrix}$$

where the retardation $\Gamma(\lambda)=4\pi\lambda_d/\lambda$, and $\lambda_d=[\Delta]nd$) is the design wavelength of the filter in the absence of tuning elements. This is the wavelength at which the birefringent element functions as a $2(\lambda)$ plate. Negligible dispersion of the fixed birefringent elements is assumed throughout the tuning range. The matrices $$A = \begin{bmatrix} e^{-\pi/4} & 0 \\ 0 & e^{\pi/4} \end{bmatrix}$$

and $$W(\lambda) = \begin{bmatrix} \cos[\Gamma_L(\lambda)/2] - i\cos[2\phi]\sin[\Gamma_L(\lambda)/2] & -i\sin[2\phi]\sin[\Gamma_L(\lambda)/2] \\ -i\sin[2\phi]\sin[\Gamma_L(\lambda)/2] & \cos[\Gamma(\lambda)/2] + i\cos[2\phi]\sin[\Gamma_L(\lambda)/2] \end{bmatrix} \tag{15b}$$

$$P_x = \begin{bmatrix} 1 & 0 \\ 0 & 0 \end{bmatrix}, \tag{14a,b}$$

$$B(\lambda) = \begin{bmatrix} \cos[\Gamma(\lambda)/2] & -i\sin[\Gamma(\lambda)/2] \\ -i\sin[\Gamma(\lambda)/2] & \cos[\Gamma(\lambda)/2] \end{bmatrix}$$

represent the achromatic $\lambda/4$ plate and $\lambda/2$ plate, respectively. In these expressions, $\phi$ is the electronically controlled tilt of the waveplate and $\Gamma_L(\lambda)$ is the retardation of the FLC cell, given by $$\Gamma_L(\lambda) = \pi \frac{\Delta n(\lambda)}{\Delta n(\lambda_d)} \frac{\lambda_d}{\lambda} \tag{16}$$

This expression includes the effect of dispersion of the FLC birefringence, $[\Delta]n(\lambda)$. To simplify the analysis, it is assumed that the FLC cells function as perfectly achromatic half-wave plates. However, the computer simulations take into account the non-achromatic nature of the FLC's. Assuming perfect achromaticity, Equation 15b can be rewritten as $$W(\lambda) = \begin{bmatrix} -\cos[2\phi] & -\sin[2\phi] \\ -\sin[2\phi] & \cos[2\phi] \end{bmatrix} \tag{17}$$

$$\Gamma_L(\lambda) = \pi \frac{\Delta n(\lambda)}{\Delta n(\lambda_d)} \frac{\lambda_d}{\lambda} \tag{16}$$

Substituting the matrices into Equation 2, and using the relation $T(\lambda)=|E'_x(\lambda)/E_x(\lambda)|^2$, yields the continuous FLCTF intensity transmittance $$T(\lambda) = \cos^2[\Gamma(\lambda)/2 - 2\phi]. \tag{18}$$

Equation 18 gives the selected wavelength $\lambda = \lambda_d/[1+\phi/\pi]$, as a function of angle of the half-wave plate. High tilt SmA* materials operating near the C*-A* transition have maximum tilt angles of approximately ±12.0. (BDH-76E mixture available from EM Industries Inc., 5 Skyline Drive, Hawthorne, N.Y.). Smectic A* materials having tilt angles up to 17.5° are known. The net tilt angle that can be obtained can be increased by cascading several FLC cells. Two half-wave plates provide a pure rotation of twice the angle between their axes. Therefore, two FLC cells which tilt in opposite directions can provide a maximum net rotation of 96°. The single stage filter illustrated in FIG. 12 was implemented as described in Example 3. The design wavelength was set at 540 nm by choice of thickness of a fixed birefringent element. The smectic A* FLC cells were a half-wave plate at 540 nm. As demonstrated by the filter transmission spectra of FIG. 13, a tuning bandwidth of about 115 nm was obtained. Appropriate application of electric field allows wavelength tuning continuously within the tuning bandwidth.

Continuously tunable filter stages can be combined to produce multistage filters in which, for example, enhanced wavelength resolution can be achieved. Design constraints are as described above for multiple-stage discretely tunable filters. The thicknesses of the birefringent elements (both fixed and variable) within a stage must vary in the same ratio from stage to stage. The exit polarizer of the preceding stage defines the plane of polarity of the light entering the next stage. Unlike the discrete filters, the switched FLC cell in the continuously tunable filter follows the fixed birefringent in the stage and an achromatic quarter-wave plate is positioned between the fixed element and the FLC cell. The fixed birefringent element can also be substituted with a smectic C* FLC cell ($\theta = 45°$).

The filter devices described herein above are believed to be the first continuously tunable FLCTF. Currently, the tunability is limited by the maximum tilt angles of two LC cells (oppositely switched). The fundamental tuning range is limited by the spectral region over which the FLC cells function as half-wave plates. The continuously tunable FLCTF has potential advantages over other tunable filters with respect to switching voltages, power consumption, entrance aperture, field-of-view and switching speeds.

The present invention has been illustrated by the presentation of a number of specific embodiments. It is not intended that the scope of the invention be limited to those embodiments and devices specifically described.

EXAMPLE 1

A Multiple-Stage Lyot-type Filters Employing SSFLC Wave Plates

Figure 2:
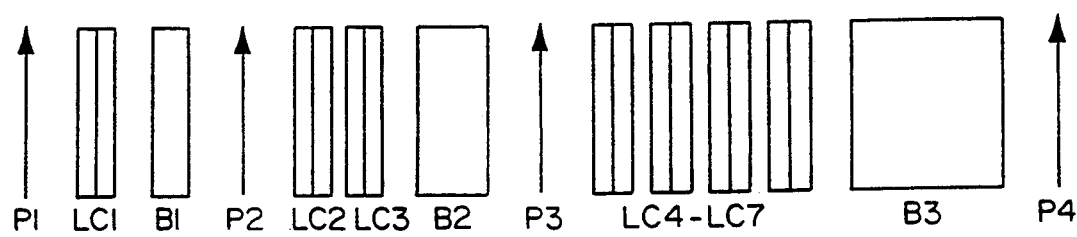
FIG. 2 illustrates a three stage Lyot-type filter incorporating smectic C* FLC wave plates. This device contains four polarizers (P1-P4), seven FLC waveplates (LC1-LC7) and three birefringent elements (B1-B3), which are 1-wave, 2-wave, and 4-wave retarders at the design wavelength.

A discretely tunable ferroelectric liquid crystal filter was experimentally demonstrated using the arrangement shown in FIG. 2. Three birefringent elements, which retard light at 475 nm by one wave, two waves, and four waves (B1, B2, B3), respectively, were sandwiched between vertical dichroic sheet polarizers (P1-P4). Each of these stages in the FLCTF is then modulated by one, two and four FLC's (LC1-LC7), respectively. These seven FLC devices, fabricated by Displaytech Inc. (Boulder, Colo.), are half-wave at 400 nm.

The FLC's were actively switched using an HP (Hewlett Packard) model 8116A function generator. The light source used was a 280 W tungsten lamp. The filter output was analyzed with a photodiode, an HP 1726A oscilloscope, and a monochromator.

The experimental results are plotted in FIG. 3 (views a and b) along with numerical solutions of theoretical curves obtained by substituting the values for G(T)d and $\lambda^*$ into Equations 1 and 10.

Figure 3A:
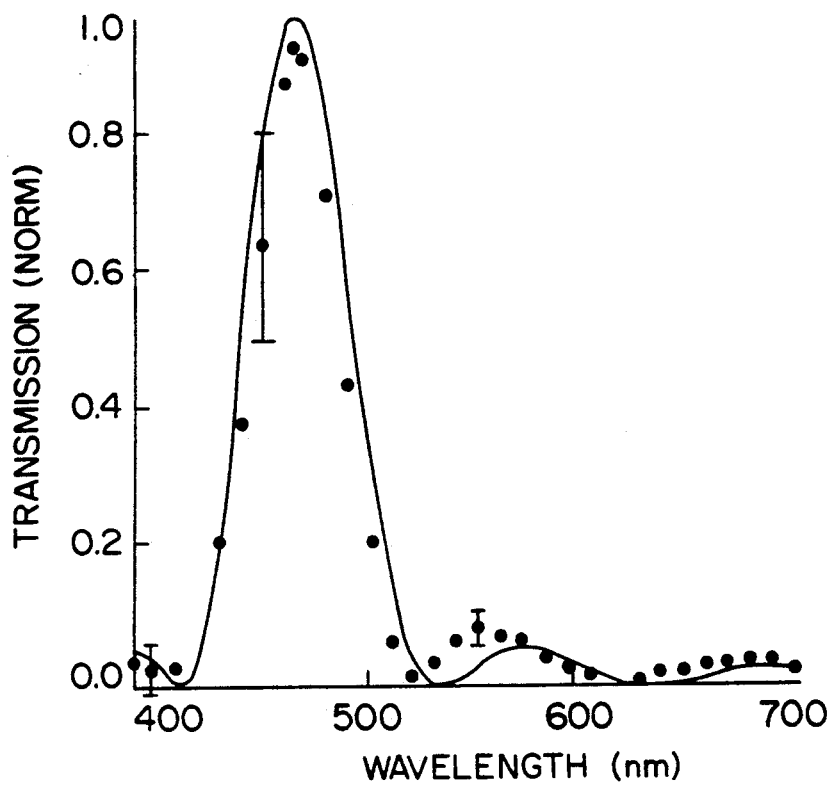
FIG. 3, views (a) and (b), compares experimental transmission (closed circles) of the three stage Lyot-type filter of FIG. 2 with simulation results (solid line). View (a) compares the measured transmission spectrum of the three stage Lyot filter, in which the SSFLC cell is in the unswitched state to simulation results and view b compares the measured transmission spectrum of the same filter in which the SSFLC cell is in the switched state.
Figure 3B:
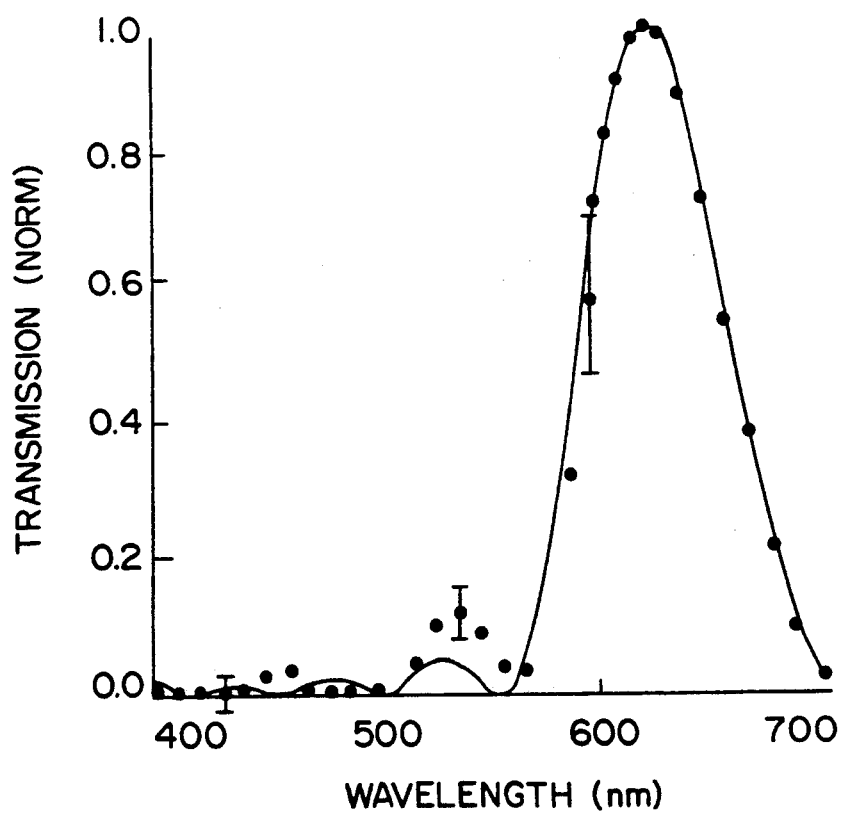

The transmission spectrum of the three-stage Lyot-type filter with the FLC's in the unswitched state ($\alpha = 0°$) is shown in FIG. 3a. Also shown is the theoretical spectrum (solid line). In FIG. 3b, the spectrum of the Lyot filter with the FLC's in the switched state ($\alpha = 45°$) is shown. The transmission is maximum at 475 nm and 625 nm, which agrees quite well with theoretical curves (taking into account the FLC dispersion).

The exemplified FLC tunable filter (FLCTF) was not optimized for maximum transmission and aperture size. However, Lyot filters have long been considered attractive for these very attributes. High quality fixed frequency Lyot filters are capable of transmitting 35-40% of incident unpolarized light (Evans, J. W. (1948) J. Opt. Soc. Am. 39:229). Well known means for optimizing birefringent filters can be applied to the filters of the present invention.

Additional transmission losses due to absorption, scattering and Fresnel reflections resulting from the addition of FLC's to a fixed frequency Lyot filter can be estimated given the transmission of a single device. This was measured to be typically 0.94 with broadband AR coating on the substrates. The aperture of the filter demonstrated was limited by the diameter of the fixed birefringent elements, as the aperture of the FLC devices was 2.5 cm.

The transmission spectrum of a desired FLCTF can be calculated in a similar manner to the theoretical curves presented in FIG. 3. FIG. 4 shows the theoretical transmission vs. wavelength curves superimposed for a six channel, five stage Lyot-type FLCTF which employs 5 FLC cells in the first stage. These cells give a retardation of $\pi/4$ at a wavelength of $\lambda = 400$ nm. Due to dispersion in the FLC's, the channels are separated by nearly 50 nm with an approximate 10-nm bandwidth. As stated above, such transmission simulations require an experimental determination of certain transmission characteristics of the FLC cells. For the FLC cells employed in this Example the experimentally measured values for these required parameters are: $G(T)d = 2.08 \times 10^{-3}$ nm$^{-1}$ and $\lambda^* = 245.0$ nm.

EXAMPLE 2

Continuously Tunable Color Filters Employing Temporal Multiplexing

A continuously tunable ferroelectric liquid crystal filter using temporal multiplexing of the FLC cells was experimentally demonstrated using the arrangement shown in FIG. 6. A four-stage Lyot-type filter with thicknesses of birefringent elements and FLC increasing in the ratio of 1, 2, 4 and 8 with stage was contructed with parallel polarizers defining the stages. The polarizers employed were HN-22 dichroic sheet polarizers. Four birefringent elements which retard light at 540 nm by one, two, four and eight waves (B1, B2, B3 and B4 respectively [FIG. 6]) were placed between the polarizers (P1-P5). Smectic C* FLC cells (SSFLC's) C1-C4 were placed in the stages of the filter between the entrance polarizer and the birefringent element. The birefringent elements are oriented at 45° with respect to the plane of polarization of light entering the stage. The FLC cells C1-C4 were constructed to have specific thicknesses 0.6 $\mu$m, 1.2 $\mu$m, 2.4 $\mu$m and 4.8 $\mu$m, respectively to retain the Lyot-structure. The use of FLC cells of varying thickness rather than multiple cells of the same thickness in different stages of the filter is preferred as the filter throughput is significantly increased and the cost and complexity of the filter is decreased. The resultant filter switches between red (switched) and green (unswitched).

The FLC cells were switched rapidly as illustrated in FIG. 7. Application of a − voltage (−vo) switches the FLC cell; application of the + voltage (+vo) switches the cells to the unswitched state (green). The light source used was a 280 W tungsten lamp. The filter output was visually observed by a subject who was believed to have normal color vision. The various color output can also be detected photographically.

Figure 7A:
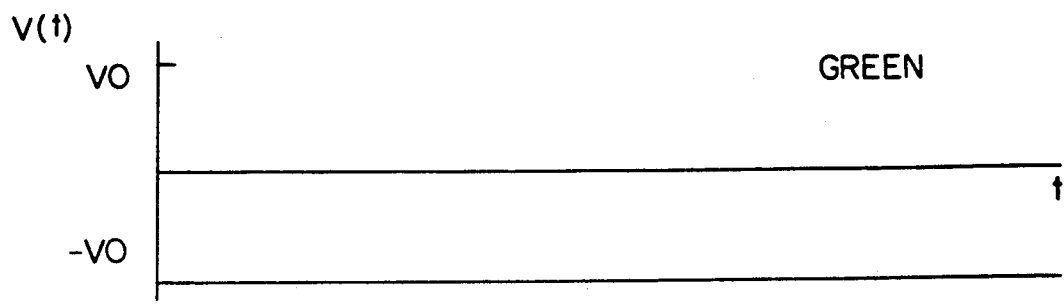
FIG. 7 illustrates the driving schemes employed to obtain visual color mixing of red and green light in the FLC filter device of FIG. 6. When the cells are unswitched, the design wavelength is transmitted (green), view a. When the cells are switched, the second color (red) is transmitted, view e. When the filter is switched between transmission of green and red, with each color on for approximately the same time using the driving scheme of view c, a yellow color is observed. When the filter is tuned to green for a higher percentage of the switching period using the driving scheme of view b, a yellow-green color is observed. When the filter is tuned to red for a higher percentage of the switching period using the driving scheme of view d, an orange color is observed. The colors listed in FIG. 7 are those observed by a subject believed to have normal color vision.
Figure 7B:
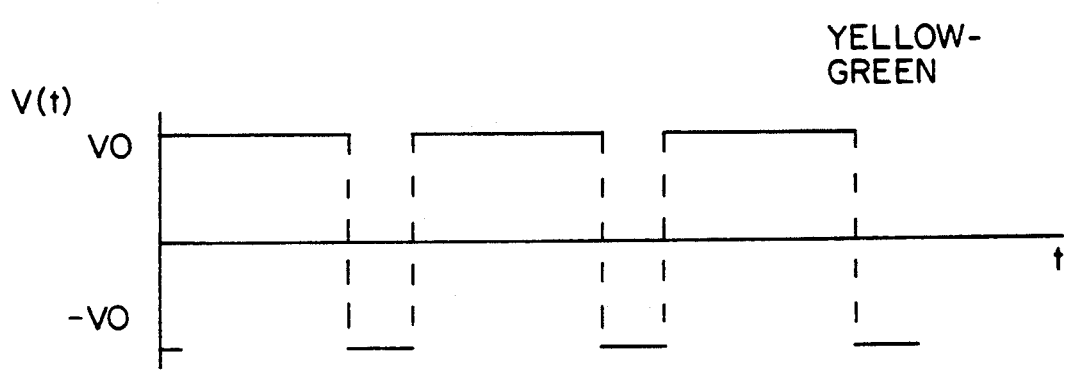
Figure 7C:
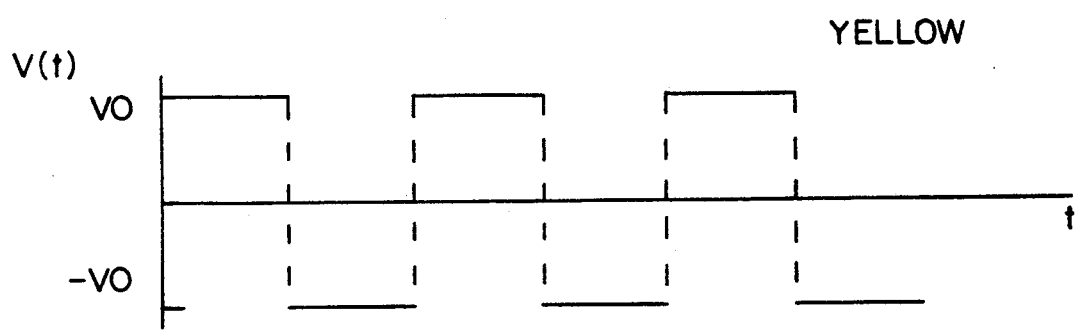
Figure 7D:
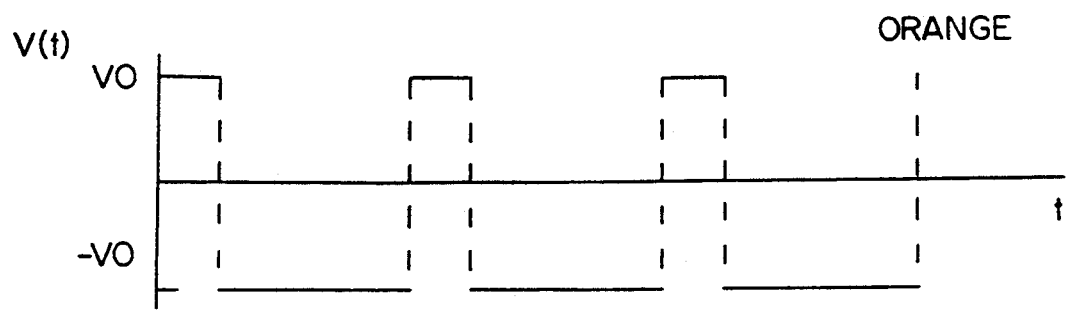
Figure 7E:
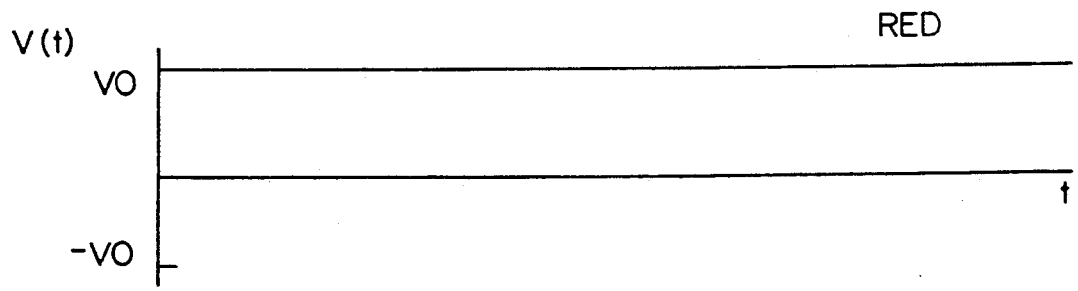

When the duty cycle of applied voltage was such that the filter transmitted green light and red light for about the same amount of time, the subject observed a yellow color (FIG. 7c). When the filter is tuned to the green for a longer percentage of the switching period that it is tuned to the red, the subject observed yellow-green (FIG. 7b). When the filter is tuned to the red for a longer percentage of the switching period than it is turned to the green, the subject observed an orange output.

EXAMPLE 3

Continuously Tunable Filters Employing Ferroelectric Liquid Crystal Materials Which Display the Electroclinic Effect The SmA* FLC single-stage tunable filter continuous FLCTF shown in FIG. 9 was experimentally demonstrated. The input and exit polarizers for the stage (P1,P2) were HN-22 dichroic sheet polarizers. A birefringent element (B), which retards light at 540 nm by two waves was used as the fixed birefringent plate. SmA* cells were fabricated to be half-wave plates at 540 nm within ±2 nm. The birefringent element and achromatic λ/4 plate were fabricated at Meadowlark Optics (City, State). Two FLC cells (maximum tilt angle of 12° each) were cascaded in this filter to increase the maximum tilt angle and expand the tuning bandwidth.

The FLC cells were switched using a single HP 6299A DC power supply and temperature controlled to 29±0.2 C°. This temperature is 1 C° above the C*-A* transition for SmA* BDH764E electroclinic material used in these experiments (DHC-764E mixture available from EM Industries Inc., 5 Skyline Drive, Hawthorne, N.Y.), maximizing $\phi$. The light source used was an Oriel model 68735 tungsten lamp. The filter output was analyzed with a monochrometer with ±1 nm resolution and a Newport 820 power meter.

Figure 10:
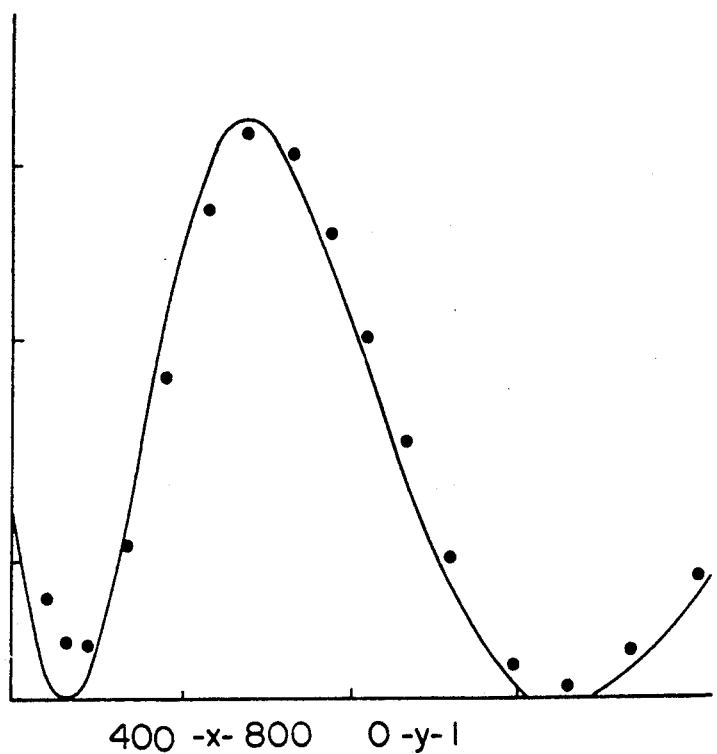
FIG. 10, views a-c, compares measured transmission (circles) of the filter illustrated in FIG. 9 to simulation results (solid lines). Transmission is shown as a function of wavelength (400-800 nm). Normalized transmission is indicated along the y axis. The transmission scale in view (a) is 0 to 1 and in views (b) and (c) it is 0 to 0.8. View (a) compares experimental and calculated transmission with the FLC waveplates in the unswitched state. View b compares experimental and calculated transmission with the FLC waveplates tuned toward the blue and view c compares experimental and calculated transmission with the FLC waveplates tuned toward the red.
Figure 10:
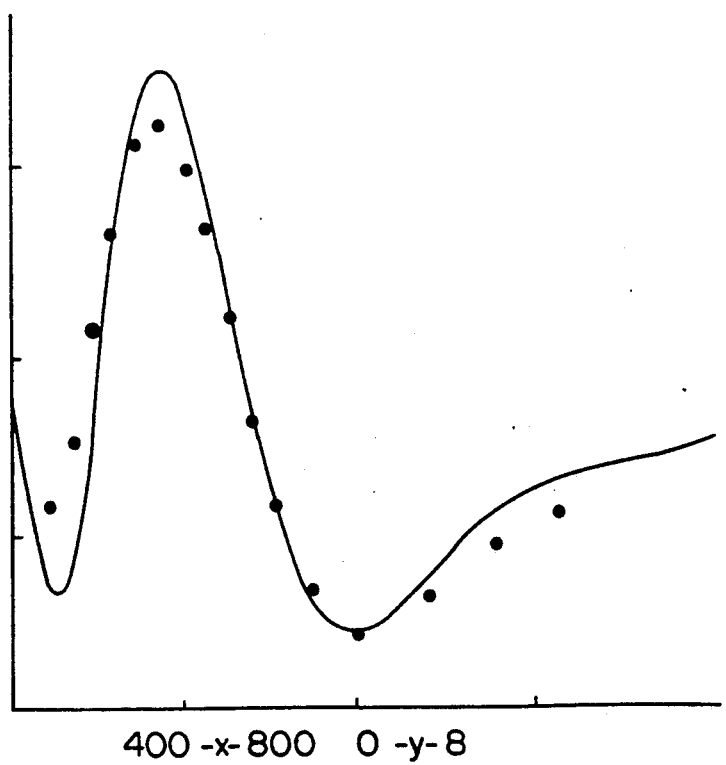
Figure 10:
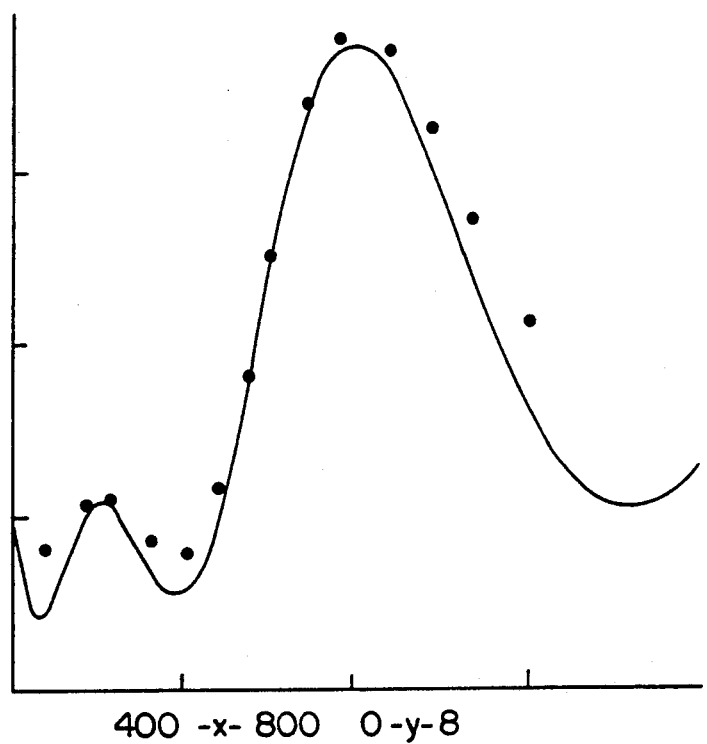

The experimental results are plotted in FIG. 10 a-c (points) along with computer simulations (solid lines). FIG. 10a is the transmission with no field applied, i.e. the design wavelength 540 nm. FIG. 10b is the transmission spectrum for a maximum tilt of +24.0°, i.e. a selected wavelength of 476 nm. FIG. 10c is the transmission spectrum for a maximum tilt of −24.0°, i.e. a selected wavelength of 623 nm. The experimental tuning bandwidth of this filter is about 115 nm. The filter can access any wavelength within this band by appropriate variation of the applied electric field.

The computer model used to calculate the filter output consists of a Jones matrix analysis, which takes into account the non-achromatic nature of the LC half-wave plates using a modified version of the Clausius Mossotti equation of molecular polarizability (Wu, S. (1986) Phys. Rev. A. 33:1270). Parameters required for this model were obtained by analyzing the transmission characteristics of FLC cells between parallel polarizers. Results of the model and experiment agree quite well. The discrepancy between the experimental bandwidth (115 nm) and that predicted in the ideal case (147 nm) is due to the non-achromaticity of the λ/2 plates.

Figure 11:
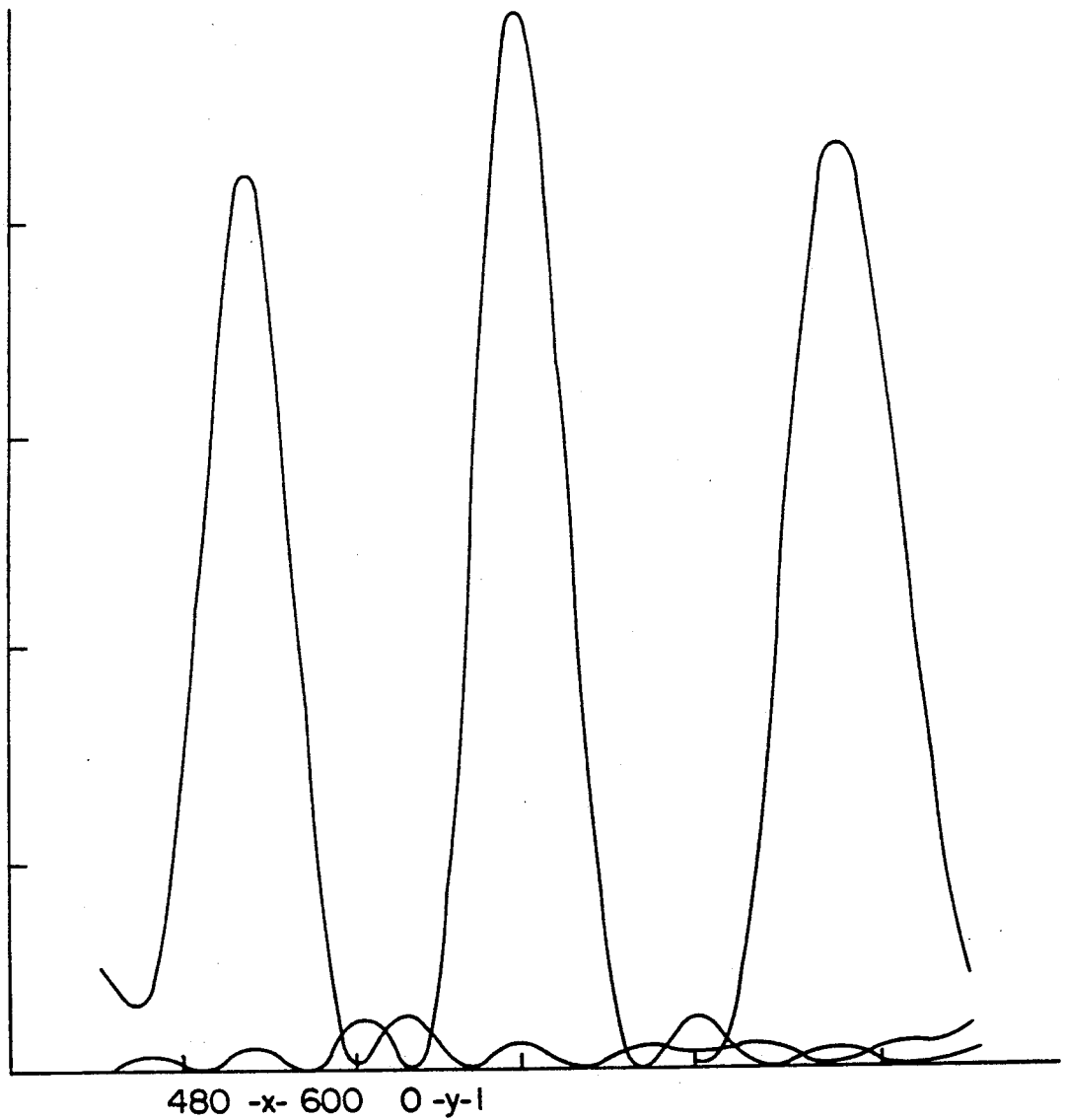
FIG. 11 illustrates a computer simulation of the transmission of a three-stage Lyot filter incorporating smectic A* liquid crystal half-wave plates. Transmission is shown as a function of wavelength (480-600 nm). The device has a full width at half maximum (FWHM) of 10 nm with continuous tunability over 70 nm.

The computer model was used to calculate the transmission spectrum of a three-stage Lyot-type filter incorporating continuously tunable stages. The multiple-stage filter provides higher spectral resolution with broad and rapid tunability. Results of this simulation are shown in FIG. 11. The simulated filter has a design wavelength of 540 nm and incorporates two FLC cells in the first stage, each having a maximum tilt angle of 12.0°, allowing a tuning range of 70 nm, with a FWHM of 10 nm. FIG. 11 shows the superposition of three spectra: the design wavelength, the shortest attainable wavelength, and the longest attainable wavelength. The filter can address any wavelength within this band.

As noted above, an electroclinic effect has been demonstrated in SSFLC-type cells incorporating short pitch liquid crystal materials, distorted helix ferroelectrics. Currently known DHF materials display maximum tilt angles of about ±38°. DHF electroclinic effect cells have been described, for example, in Beresnev et al. EPO Patent Application 309,774 (published Apr. 5, 1989). Such DHF cells can be employed in place of or in combination with smectic A* FLC cells in the continuous filter configurations described herein.

We claim:

1. A tunable optical filter comprising one or more stages positioned in series along a light propagation axis wherein a stage comprises:

an entrance polarizer which defines a plane of polarization of light entering said filter stage and an exit polarizer which is oriented in a fixed position with respect to said entrance polarizer;

at least one birefringent element and at least one ferroelectric liquid crystal cell positioned in series along said light propagation axis between said polarizers wherein said birefringent element is positioned between said exit polarizer and said ferroelectric liquid crystal cell; and means for applying an electric field to said ferroelectric liquid crystal cell such that said cell is thereby switched between an unswitched state and a switched state;

wherein said polarizers, said ferroelectric liquid crystal cell and said birefringent element are oriented with respect to each other and the plane of polarization of entering light such that, when said electric field is applied to switch said ferroelectric liquid crystal cell between said unswitched and said switched state, the output of said filter is thereby tuned between a first transmission spectrum defined by the transmission characteristics of said birefringent element and a second transmission spectrum defined by the combined transmission characteristics of said birefringent element and said ferroelectric liquid crystal cell in the switched state; and wherein, when said filter contains more than one stage, the exit polarizer of a stage is the entrance polarizer for the next successive stage positioned in series along said light propagation axis of said filter.

2. The filter of claim 1 which contains one stage and wherein said birefringent element is a fixed birefringent element.

3. The filter of claim 1 which contains more than one stage and wherein said birefringent element is selected from the group consisting of a fixed birefringent element and a variable birefringent element.

4. The filter of claim 3 wherein said variable birefringent element is a ferroelectric liquid crystal cell.

5. The filter of claim 4 wherein said variable birefringent element is a surface stabilized, ferroelectric liquid crystal cell.

6. The filter of claim 4 wherein said variable birefringent element is a ferroelectric liquid crystal cell containing a ferroelectric liquid crystal material which is selected from the group consisting of a surface stabilized, smectic C* ferroelectric liquid crystal material, a surface stabilized, smectic A* ferroelectric liquid crystal material and a distorted helix ferroelectric liquid crystal material.

7. The filter of claim 1 wherein said ferroelectric liquid crystal cell is a surface stabilized, ferroelectric liquid crystal cell.

8. The filter of claim 1 wherein said ferroelectric liquid crystal cell contains a ferroelectric liquid crystal which is selected from the group consisting of a surface stabilized, smectic C* ferroelectric liquid crystal material, a surface stabilized, smectic A* ferroelectric liquid crystal material and a distorted helix ferroelectric liquid crystal material.

9. The filter of claim 1 wherein said ferroelectric liquid crystal cell is a smectic C* ferroelectric liquid crystal cell.

10. The filter of claim 9 wherein said ferroelectric liquid crystal cell is a surface stabilized, ferroelectric crystal cell.

11. The filter of claim 1 wherein said entrance and exit polarizers of said stage are oriented parallel to one another.

12. The filter of claim 1 wherein said entrance and exit polarizers of said stage are oriented perpendicular to one another.

13. The filter of claim 1 wherein said birefringent element is a fixed birefringent element and is oriented at an angle of 45° with respect to the plane of polarization of light entering said stage.

14. The filter of claim 1 which contains more than one stage and wherein each stage comprises at least one ferroelectric liquid crystal cell and a birefringent element.

15. The filter of claim 14 wherein each stage comprises one ferroelectric liquid crystal cell and wherein said birefringent element is a fixed birefringent element.

16. The filter of claim 14 wherein said birefringent element is a fixed birefringent element.

17. The filter of claim 16 wherein said fixed birefringent element is oriented at an angle of 45° with respect to the plane of polarization of light entering said stage.

18. The filter of claim 14 which has a Lyot-type structure.

19. The filter of claim 1 wherein said stage comprises two or more ferroelectric liquid crystal cells.

20. The filter of claim 19 wherein said ferroelectric liquid crystal cells are independently switchable between said unswitched state and said switched state.

21. The filter of claim 20 wherein said ferroelectric liquid crystal cells are surface stabilized, smectic C* ferroelectric liquid crystal cells.

22. The filter of claim 19 which contains more than two stages.

23. The filter of claim 22 which as a Lyot-type structure.

24. The filter of claim 1 wherein said polarizers of said stage are oriented parallel to one another wherein said birefringent element is a fixed birefringent element oriented at an angle of 45° with respect to the plane of polarization of light entering said stage.

25. The filter of claim 24 wherein said stage comprises two or more ferroelectric liquid crystal cells which are independently switchable between said switched state and said unswitched state.

26. The filter of claim 25 wherein said ferroelectric liquid crystal cells are smectic C* SSFLC cells.

27. The filter of claim 24 which contains more than one stage.

28. The filter of claim 27 which has a Lyot-type structure.

29. The filter of claim 1 wherein said electric field is applied to said ferroelectric liquid crystal such that the output of said filter is rapidly tuned between said first transmission spectrum and said second transmission spectrum.

30. The filter of claim 29 which transmits wavelengths in the visible spectrum and wherein the output of said filter is tuned between said transmission spectra at such a rate that the spectra are detected by a slow response detector as superimposed.

31. The filter of claim 30 wherein the output is detected by the human eye and the rapid tuning between said output transmission spectra results in a perceived continuous variation in visible colors.

32. The filter of claim 31 wherein, when the number of stages is more than one, the filter has a Lyot-type structure; wherein said stage contains one birefringent element and one smectic C* ferroelectric liquid crystal cell; wherein said entrance and exit polarizers of said stage are oriented parallel to one another; wherein the birefringent element is a fixed birefringent element oriented at an angle of 45° to the plane of polarized light entering said stage, with the thickness of said birefringent element being selected such that in the unswitched state said filter transmits a first transmission spectrum which is perceived by the human eye as a first visible color and the thickness of said ferroelectric liquid crystal being selected such that in the switched state said filter transmits a second transmission spectrum which is perceived by the human eye as a second visible color; and wherein, when said ferroelectric liquid crystal is switched between said unswitched and said switched stage, the output of said filter is tuned between said first transmission spectrum and said second transmission spectrum such that a continuous variation in colors which are linear combinations of said first and second visible colors are perceived.

33. The filter of claim 31 which has one or more stages wherein when the number of stages is greater than one the filter has a Lyot-type structure wherein said stage contains one birefringent element and two smectic C* ferroelectric liquid crystal cells wherein said entrance and exit polarizers are oriented parallel to one another; wherein the birefringent element is a fixed birefringent element oriented at an angle of 45° to the plane of polarized light entering said stage, with the thickness of said birefringent element being selected such that in the unswitched state said filter transmits a first transmission spectrum which is perceived by the human eye as a first visible color and the thicknesses of said ferroelectric liquid crystals being selected such that when one of said ferroelectric liquid crystal cells is in the switched state said filter transmits a second transmission spectrum which is perceived by the human eye as a second visible color and when both of said ferroelectric liquid crystal cells are in the switched state said filter transmits a third transmission spectrum which is perceived by the human eye as a third visible color; and wherein the output of said filter are tuned between said first, second and third transmission spectra such that a continuous variation in colors which are linear combinations of said first, second and third visible colors are perceived.

34. The filter of claim 33 wherein the thicknesses of said birefringent element and said ferroelectric liquid crystal cells are selected so that said visible colors are red, blue and green.

35. A blocking filter which comprises N stages positioned along a light propagation axis wherein N [=3 or more along a light propagation axis] is three or more; wherein a stage comprises:
   an entrance polarizer and an exit polarizer which are oriented either parallel or perpendicular to one another wherein the entrance polarizer determines the plane of polarization of light entering said stage;
   a ferroelectric liquid crystal cell positioned between said polarizers such that in its unswitched state the plane defined by the optic axis of said cell and said light propagation axis is parallel to said plane of polarization of entering light; wherein the thickness of said cell and the orientation of said polarizers are chosen such that when said ferroelectric liquid crystal is in the switched state said filter transmits a desired wavelength band while blocking an undesired wavelength band; and
   means for applying an electric field to said ferroelectric liquid crystal cell such that said cell is thereby switched between an unswitched state and a switched state;
wherein the exit polarizer of a stage in the entrance polarizer for the next successive state, said N stage filter thereby comprising N ferroelectric liquid crystal cells; and
wherein said N ferroelectric liquid crystal cells in said different stages are synchronously switched in pairs of two by application of said electric field such that when each pair of cells is switched the filter transmits a selected wavelength band while blocking at least two undesired wavelength bands.

36. The blocking filter of claim 35 wherein said filter, when said pair of ferroelectric liquid crystals are in the switched state, transmits wavelengths within the visible spectrum.

37. The blocking filter of claim 36 wherein said electric field is applied to said pairs of ferroelectric liquid crystals such that the output of said filter is rapidly tunable between transmission spectra.

38. The blocking filter of claim 37 wherein the output of said filter is switched between said transmission spectra at such a rate that the spectra are detected by a slow response detector as superimposed.

39. The blocking filter of claim 38 wherein the output is detected by the human eye and the rapid tuning between said output transmission spectra results in a perceived continuous variation in visible colors.

40. The blocking filter of claim 39 which comprises three stages:
   a first stage comprises a blue blocking surface stabilized smectic C* ferroelectric liquid crystal cell which is a $3/2\pi$ waveplate at 460 nm bounded by parallel polarizers,
   a second stage comprises a green blocking surface stabilized smectic C* ferroelectric liquid crystal cell which is a $3/2\pi$ waveplate at 550 nm bounded by parallel polarizers and
   a third stage comprises a red blocking surface stabilized smectic C* ferroelectric liquid crystal cell which is a full waveplate at 670 nm which is bounded by perpendicular polarizers;
wherein, when all cells are not in the unswitched state said filter transmits the unaltered source light, when all cells are in the switched state said filter transmits no light, when said blue blocking and said green blocking cells are in the switched state said filter transmits a red color, when said green blocking and said red blocking cells are switched said filter transmits a blue color, and when said blue blocking and said red blocking cells are in the switched state said filter transmits a green color; and wherein rapid switching of said blocking cells in pairs results in a filter output transmission which is perceived as a continuously variable color output.

* * * * *

UNITED STATES PATENT AND TRADEMARK OFFICE
CERTIFICATE OF CORRECTION

PATENT NO. : 5,132,826
DATED : July 21, 1992
INVENTOR(S) : Kristina M. Johnson and Gary D. Sharp It is certified that error appears in the above-identified patent and that said Letters Patent is hereby corrected as shown below:

At column 16, lines 1-8 (lines bridging pages 36 and 37), please delete $$P_x = \begin{bmatrix} 1 & 0 \\ 0 & 0 \end{bmatrix}, \quad (14a, b)$$

$$B(\lambda) = \begin{bmatrix} \cos[\Gamma(\lambda)/2] & -i\sin[\Gamma(\lambda)/2] \\ -i\sin[\Gamma(\lambda)/2] & \cos[\Gamma(\lambda)/2] \end{bmatrix}"$$

At column 16, lines 30-33 (page 37, lines 16-17), please delete

" $\Gamma_L(\lambda) = \pi \dfrac{\Delta n(\lambda)}{\Delta n(\lambda_d)} \dfrac{\lambda_d}{\lambda}$ (16)"

At column 21, claim 23, line 58, please rewrite "which as" as -- which has--. At column 22, claim 32, line 40, please rewrite "stage" as --states--. At column 23, claim 35, lines 8 and 9, please delete "[=3 or more along a light propagation axis]".

At column 24, lines 15-40, please delete claim 40.

Signed and Sealed this

Eighteenth Day of January, 1994

BRUCE LEHMAN

Attest:

Attesting Officer

Commissioner of Patents and Trademarks